(12) United States Patent
Velazquez et al.

(10) Patent No.: US 12,267,095 B2
(45) Date of Patent: Apr. 1, 2025

(54) SIGNAL CANCELLER

(71) Applicant: Linearity, LLC, San Diego, CA (US)

(72) Inventors: Scott Richard Velazquez, San Diego, CA (US); Yujia Wang, San Diego, CA (US)

(73) Assignee: Linearity, LLC, San Diego, CA (US)

( * ) Notice: Subject to any disclaimer, the term of this patent is extended or adjusted under 35 U.S.C. 154(b) by 96 days.

(21) Appl. No.: 17/207,510

(22) Filed: Mar. 19, 2021

(65) Prior Publication Data

US 2024/0080053 A1 Mar. 7, 2024

Related U.S. Application Data

(63) Continuation-in-part of application No. 17/163,203, filed on Jan. 29, 2021, now abandoned, which is a continuation-in-part of application No. 15/807,419, filed on Nov. 8, 2017, now Pat. No. 11,463,072.

(60) Provisional application No. 62/992,804, filed on Mar. 20, 2020.

(51) Int. Cl.
*H04B 1/10* (2006.01)
*H04B 1/40* (2015.01)

(52) U.S. Cl.
CPC .............. *H04B 1/1027* (2013.01); *H04B 1/40* (2013.01)

(58) Field of Classification Search
CPC ................................ H04B 1/1027; H04B 1/40
See application file for complete search history.

(56) References Cited

U.S. PATENT DOCUMENTS

| | | |
|---|---|---|
| 6,449,110 B1 | 9/2002 | Degroat et al. |
| 6,587,514 B1 | 7/2003 | Wright et al. |
| 7,012,772 B1 | 3/2006 | Vis |
| 7,123,659 B2 | 10/2006 | Orihashi et al. |
| 7,782,235 B1 | 8/2010 | Velazquez |
| 7,940,198 B1 | 5/2011 | Velazquez |
| 8,164,496 B2 | 4/2012 | Velazquez |
| 8,582,694 B2 | 11/2013 | Velazquez et al. |
| 9,705,477 B2 | 7/2017 | Velazquez |
| 2017/0180160 A1* | 6/2017 | Moorti ................ H04L 27/2651 |

* cited by examiner

*Primary Examiner* — David S Huang
(74) *Attorney, Agent, or Firm* — Akerman LLP

(57) ABSTRACT

The present invention is an architecture and method for radio frequency (RF) simultaneous transmit and receive applications that uses linear and nonlinear modeling to generate a very accurate, wideband analog signal that cancels self-interference before it is digitized by the receiver. In addition to this digitally assisted analog cancellation, another layer of signal cancellation is provided with digital blind source separation. Adaptive signal processing continuously monitors the level of cancellation and updates the processing to provide optimal performance in changing conditions (e.g., rapidly changing frequency content, signal power, temperature, etc.). Signal cancellation can be performed on extremely broadband signals providing high levels of cancellation, enabling a full-duplex RF transceiver. Furthermore, the present invention optionally includes an external signal canceller for cancelling unknown interference such as jamming.

17 Claims, 37 Drawing Sheets

SIGNAL CANCELLER

CROSS-REFERENCE TO RELATED APPLICATION

The present application claims priority to U.S. Provisional Patent Application No. 62/992,804, entitled "Adaptive Signal Canceller," filed on Mar. 20, 2020, and is a continuation-in-part of U.S. patent application Ser. No. 17/163,203, entitled "Nonlinear Compensator for Transceivers," filed on Jan. 29, 2021, which in turn claims priority and is a continuation-in-part of U.S. patent application Ser. No. 15/807,419, entitled "Adaptive Volterra Compensator," filed on Nov. 8, 2017, the entire disclosures of which are all incorporated by reference herein.

BACKGROUND OF THE INVENTION

1. Field of Invention

The present invention relates to electronics and, more specifically, to techniques for reducing interference in radio frequency (RF) transceiver systems, including self-interference and external interference.

2. Description of Related Art

Most current RF wireless systems are not capable of transmitting and receiving simultaneously using the same frequency band (i.e., half-duplex). Technologies that enable full-duplex operation effectively double the system throughput, which significantly mitigates spectrum congestion. The primary challenge to simultaneous transmit and receive (STAR) systems is the self-interference caused by the transmit signal interfering with the receive signal. Many modern systems require cancellation of self-interference with enough accuracy to detect the received signal when the transmit signal is 70 to 100 dB larger.

Some techniques for self-interference have been tried in the past with limited performance over narrow bandwidth, often with large, high-power, and expensive RF electronics. Deformable antennas for spatial processing to mitigate self-interference have recently been demonstrated to provide promising self-interference rejection.

One challenging factor limiting the level of interference rejection and bandwidth is nonlinear distortion in the transmit signal chain. Nonlinear distortion includes frequency dependent memory effects seen as spectral spreading, intermodulation distortion, and harmonic distortion. The transmit RF power amplifier is usually the dominant source of nonlinear distortion, which introduces distortion components that vary over frequency and output power level, antenna load, and may drift over time and temperature.

Some previous approaches to canceling self-interference simply delay and adjust the gain of the transmit signal to cancel the self-interference before it is digitized by the receive chain. These approaches do not account for the frequency dependent amplitude and phase transfer function or the nonlinear distortion introduced in the signal chain.

Furthermore, RF transceiver systems are also sensitive to external sources of interference, including intentional jamming signals for electronic warfare applications or unintended interference such as nearby transmitters (co-site interference) or adjacent channel interference.

Accordingly, a need exists to effectively mitigate both self-interference and external interference in a dynamic signal environment.

SUMMARY OF THE INVENTION

The present invention overcomes these and other deficiencies of the prior art by providing an effective technique to cancel interference with modeling of linear and nonlinear distortion mechanisms, digitally assisted analog cancellation, and digital source separation techniques.

Unlike the prior art, the present invention includes multiple layers of cancellation. Digitally assisted analog cancellation uses both linear and nonlinear modeling to more accurately represent the transfer function of the RF transmit chain than conventional fixed models. The novel augmentation of using nonlinear modeling enables a high-fidelity representation of the actual self-interference signal needed for high degrees of cancellation, even with nonlinear electronics.

Another layer of cancellation extracts the desired signal from the digitized received signal using blind source separation techniques. The three layers of cancellation combined typically provide 70-100 dB levels of cancellation. Modern wideband ADCs and DACs enable cancellation over wide instantaneous frequencies (e.g., greater than 1 GHz with commercial off-the-shelf parts) by leveraging polyphase filtering techniques for high data throughput.

In an embodiment of the invention, a device comprises: a transmit chain comprising a first digital-to-analog converter (DAC) and a power amplifier, wherein the transmit chain produces an analog transmit signal; a receiver chain comprising a first analog-to-digital converter (ADC); a second DAC; a digital signal processor comprising an adaptive signal cancellation digital signal processing (DSP) algorithm, the digital signal processor coupled to an output of the first ADC and coupled to an input of the second DAC; and a summer coupled to an output the second DAC and coupled to an input of the first ADC. The digital signal processor produces a digital cancellation signal, the second DAC converts the digital cancellation signal into an analog digital cancellation signal. The summer receives an analog receive signal comprising a self-interference signal, the analog digital cancellation signal represents an out-of-phase version of the self-interference signal. The device further comprises a second ADC coupled to an input of the digital signal processor, wherein the second ADC converts the analog receive signal to a digital receive signal. The digital signal processor receives as input a digital transmit signal, the first DAC receives as input the digital transmit signal. The digital signal processor may comprise a blind source separation algorithm. The digital signal processor may comprise a linear finite impulse response filter. The digital signal processor may comprise an adaptive linear system identification algorithm to optimize linear filter coefficients within the linear finite impulse response filter. The digital signal processor may comprise a nonlinear Volterra filter. The digital signal processor may comprise an adaptive nonlinear system identification algorithm to optimize nonlinear filter coefficients within the Volterra filter. The digital signal processor may comprise a multi-dimensional compensator. The digital signal processor may comprise an adaptive system identification algorithm to optimize coefficients within the multi-dimensional compensator. The device of may further comprise: a third ADC, an adaptive signal cancellation digital signal processor, and a third DAC, an output of the third DAC is coupled to an input of the summer; and a delay receiving the analog receive signal, wherein an output of the delay is coupled to an input of the summer.

In another embodiment of the invention, a method for cancelling self-interference in a transceiver comprises the steps: receiving an analog receive signal; combining the analog receive signal with an analog cancellation signal to produce a combined analog signal; wherein the analog cancellation signal represents an out-of-phase version of a self-interference signal introduced by a transmit chain of a transceiver; converting the combined analog receive signal to a combined digital signal, inputting the combined digital signal and a digital transmit signal into a digital signal processor implementing an adaptive signal cancellation digital signal processing (DSP) algorithm; producing, at the digital signal processor, a digital cancellation signal; converting the digital cancellation signal into the analog cancellation signal; and adjusting a linear model and a nonlinear model in the adaptive signal cancellation DSP algorithm. The method may further comprise the steps of: converting the analog receive signal to a digital receive signal; and inputting the digital receive signal into the digital signal processor. The digital signal processor may comprise a blind source separation algorithm. The step of adjusting a linear model and a nonlinear model in the adaptive signal cancellation DSP algorithm may comprise the step of optimizing linear filter coefficients and nonlinear filter coefficients. The method may further comprise the steps of: producing a delayed analog receive signal from the analog receive signal; converting the analog receive signal into a digital receive signal; adjusting an amplitude and a phase of the digital receive signal to produce an adjusted signal; and combining the delayed analog receive signal and the adjusted signal with the combined analog signal to cancel external interference in the analog receive signal.

In yet another embodiment of the invention, a method for calibrating a linear model and a nonlinear model in a self-interference signal canceller comprises the steps: receiving an analog predetermined test signal; converting the analog predetermined test signal to a digital test signal, inputting the digital test signal and a digital transmit signal into a digital signal processor implementing an adaptive signal cancellation digital signal processing (DSP) algorithm; producing, at the digital signal processor, a digital cancellation signal; and identifying a linear model and a nonlinear model in the adaptive signal cancellation DSP algorithm. The method may comprise the steps of: converting the digital cancellation signal to an analog cancellation signal; combining the analog predetermined test signal with the analog cancellation signal to produce a combined analog signal, wherein the analog cancellation signal represents an out-of-phase version of a self-interference signal introduced by a transmit chain of a transceiver; converting the combined analog receive signal to a combined digital signal, inputting the combined digital signal and the digital transmit signal into the digital signal processor; and adjusting the linear model and the nonlinear model in the adaptive signal cancellation DSP algorithm.

The foregoing and other features and advantages of the invention will be apparent from the following, more particular description of the preferred embodiments of the invention, the accompanying drawings, and the claims.

BRIEF DESCRIPTION OF THE DRAWINGS

For a more complete understanding of the present invention and advantages thereof, reference is now made to the ensuing descriptions taken in connection with the accompanying drawings briefly described as follows.

DETAILED DESCRIPTION OF EMBODIMENTS

Figure 1:
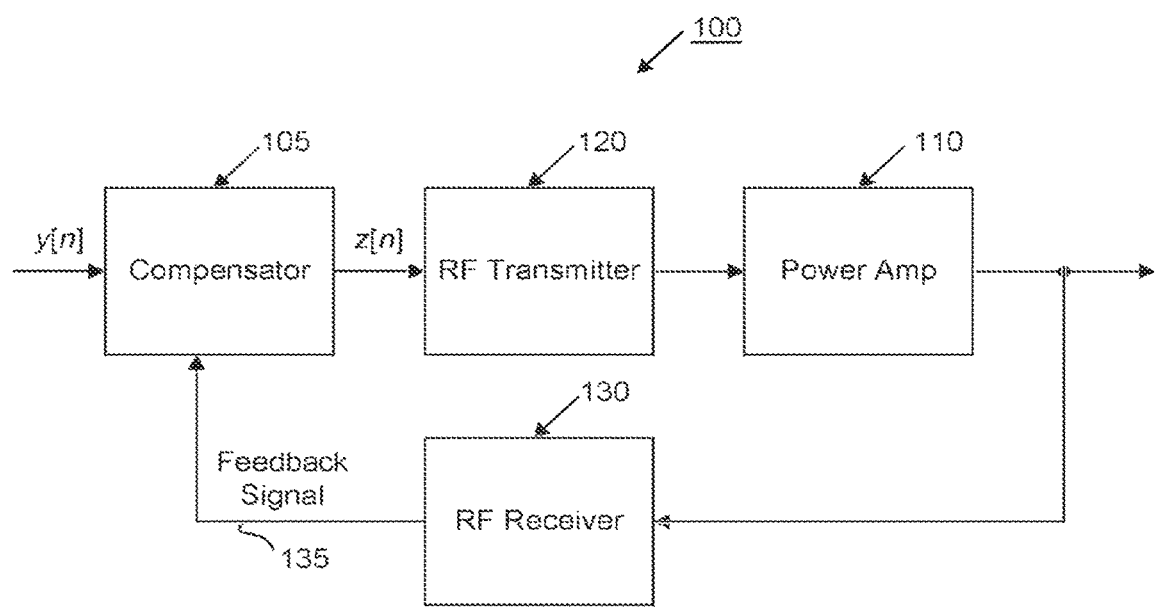
FIG. 1 illustrates an adaptive linearized power amplifier system.
Figure 2:
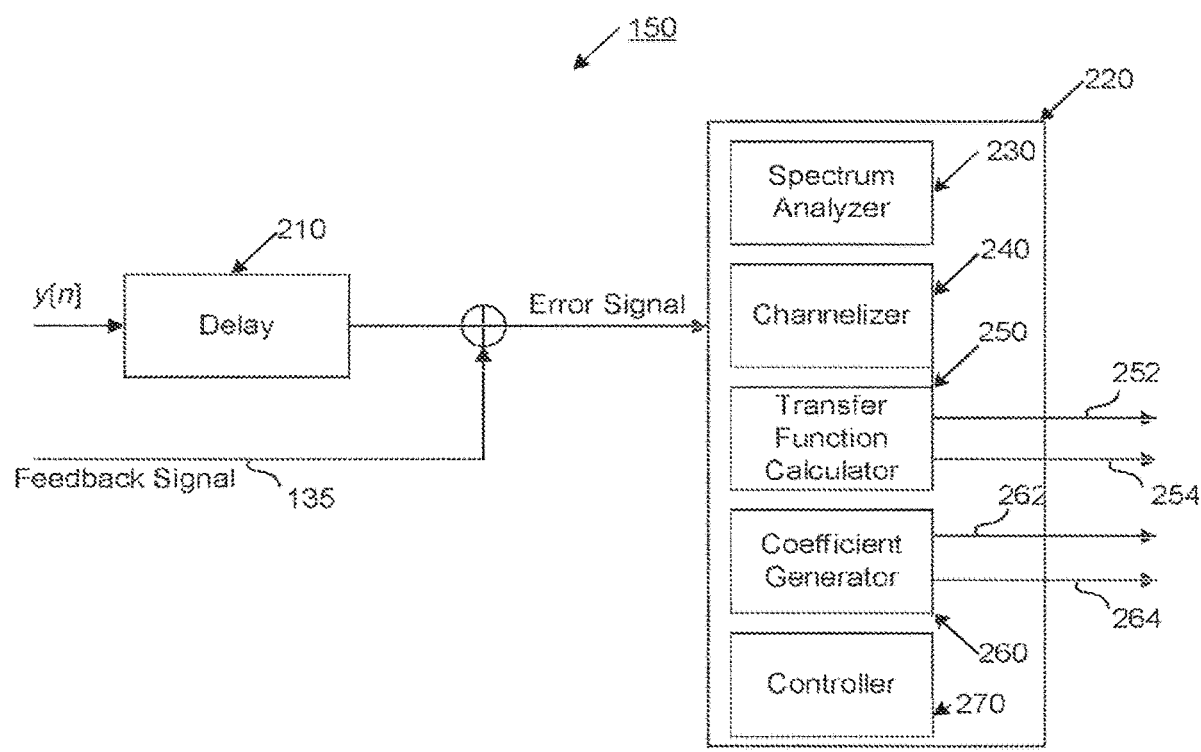
FIG. 2 illustrates the adaptive nonlinear distortion estimator of the compensator shown in FIG. 1.
Figure 3:
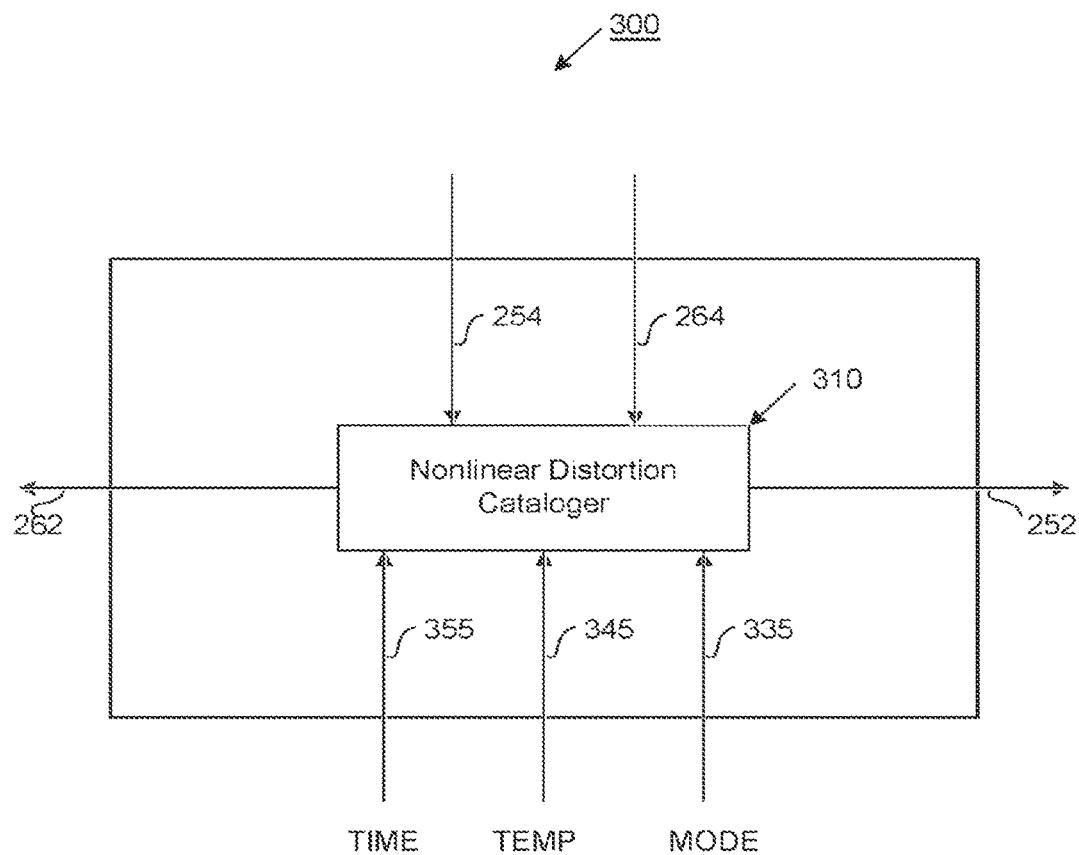
FIG. 3 illustrates a heuristic calibration system.
Figure 4:
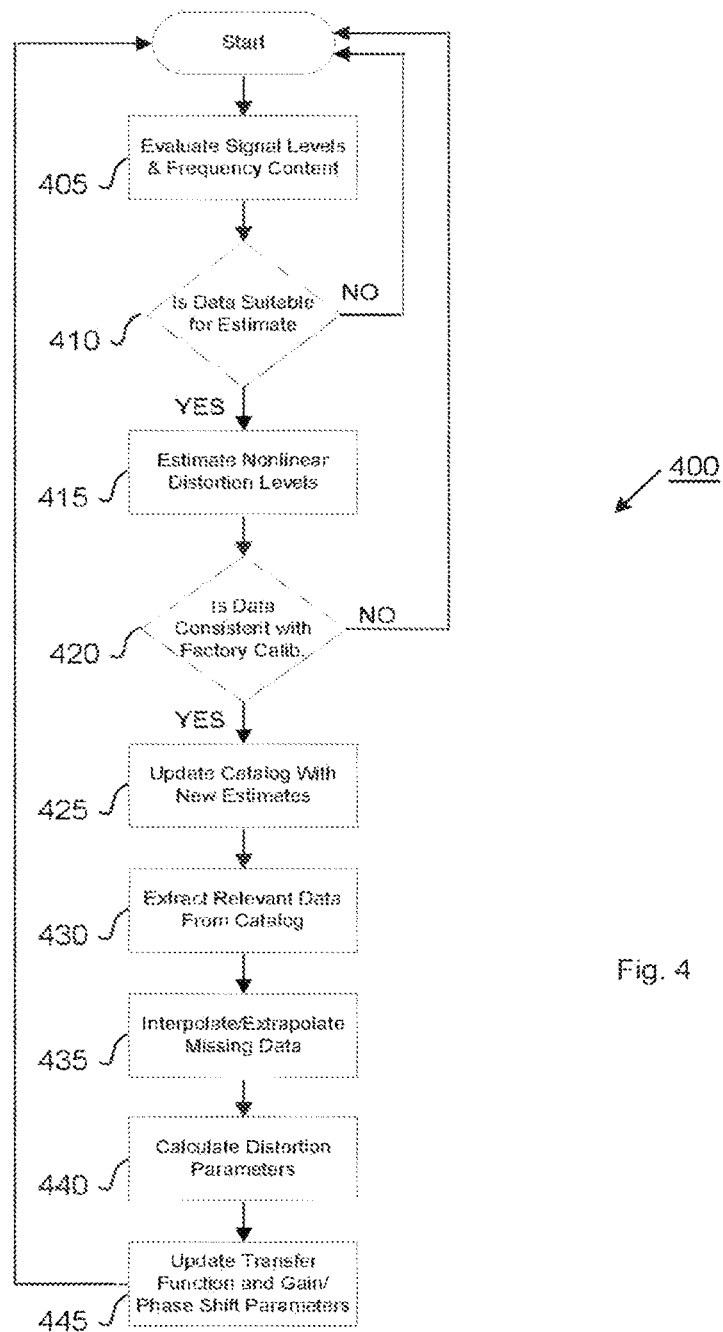
FIG. 4 illustrates a process for heuristically compensating nonlinear distortion.
Figure 5:
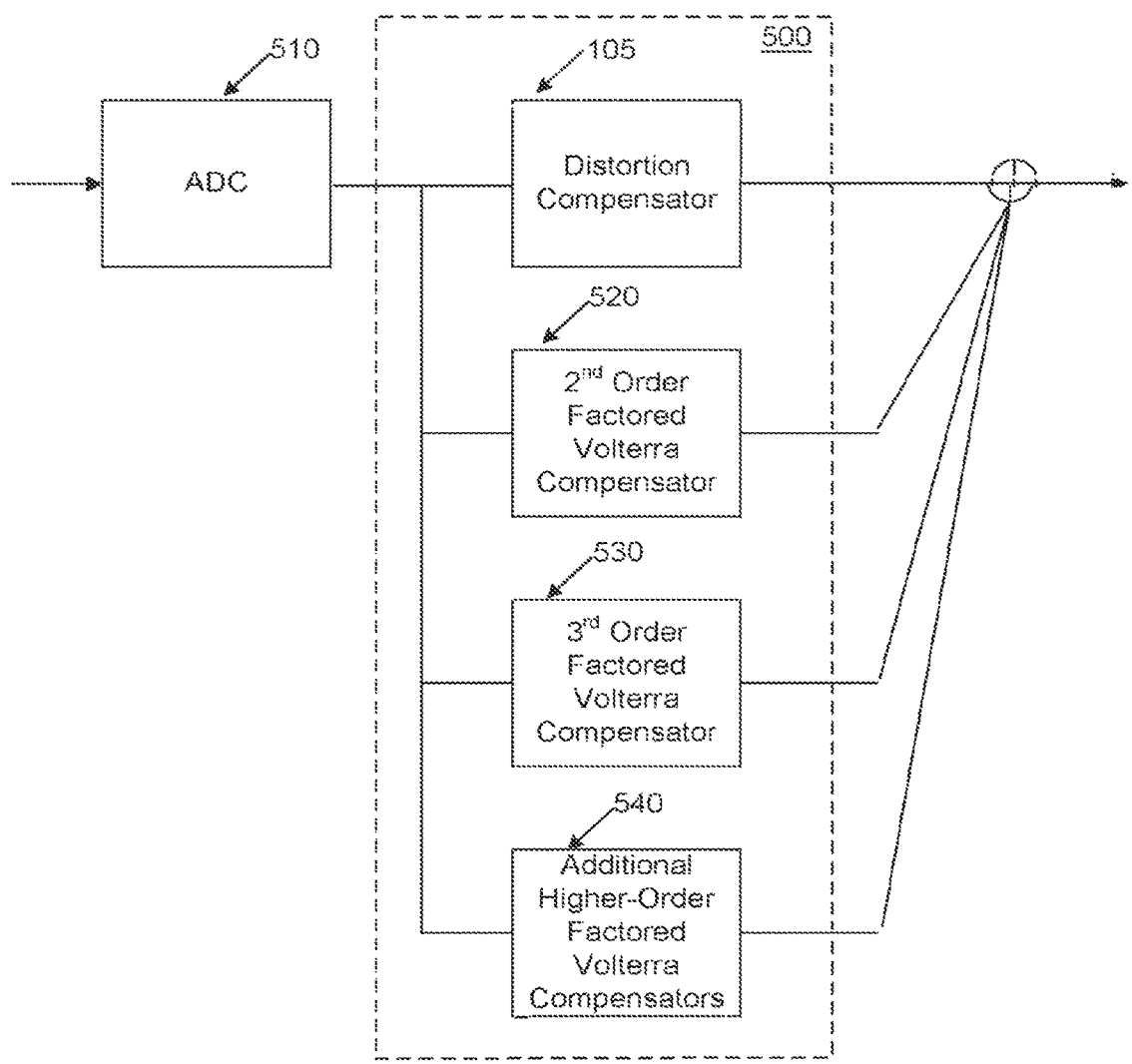
FIG. 5 illustrates a block diagram of a linearity compensator according to an embodiment of the invention.
Figure 6:
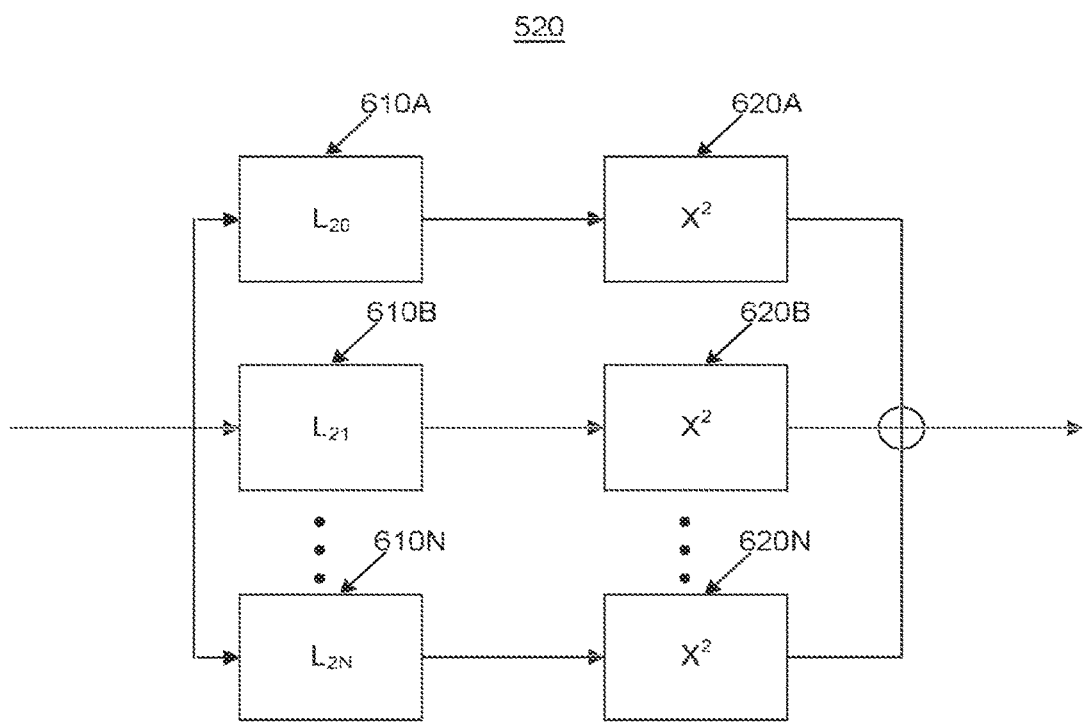
FIG. 6 illustrates the structure of the second-order factored Volterra compensator according to an embodiment of the invention.

Further features and advantages of the invention, as well as the structure and operation of various embodiments of the invention, are described in detail below with reference to the accompanying FIGS. 1-36, wherein like reference numerals refer to like elements. Although the invention is described in the context of RF transceivers, one of ordinary skill in the art readily appreciates that the techniques and embodiments described herein are applicable to any type of electronic component where it is desired to eliminate interference accurately and adequately.

Many techniques have been developed to model various linear and nonlinear distortion mechanisms in electronic devices with the goal of using minimal signal processing size, weight, and power requirements. Some techniques such as polynomial nonlinear models, nonlinear filters (such as Volterra filters or generalized memory polynomials) are accurate and effective methods. For example, U.S. Pat. No. 9,705,477, the entire disclosure of which is incorporated by reference herein, provides a model for nonlinear distortion utilizing factored Volterra compensators, including a second-order factored Volterra compensator, a third-order factored Volterra compensator, and additional higher-order factored Volterra compensators. In addition, methods for adaptive background calibration of these techniques have been developed to adapt the processing to dynamic signal environments.

Alternatively, linear and nonlinear modeling as used in a multi-dimensional compensator, such as U.S. Pat. No. 10,911,029, the entire disclosure of which is incorporated by reference herein, accurately models distortion by using a multitude of functions of the input signal to track distortion mechanisms that vary over frequency, time, temperature, power level, and other parameters. The functions of the input are used to model the various changing states of the device very accurately. For example, the functions include the present signal value, delay function, derivative function (including higher-order derivatives), integral function (including higher-order integrals), signal statistics (mean, median, standard deviation, variance), covariance function, power calculation function (RMS or peak), polynomial functions, and any combination thereof. These functions can be implemented in digital signal processing (DSP) with minimal resources (including without the use of multipliers or filters, which can be large and consume a large amount of power). These functions are used to index a memory to store correction values based on the current state of the device. Alternatively, a function such as a memoryless polynomial equation can be used instead of a memory to reduce the size of an implementation of the multi-dimensional compensator.

In the present invention, the linear and nonlinear transfer functions can be accurately implemented with the same linear and nonlinear models used in the multi-dimensional compensator. Furthermore, the linear and nonlinear models in the multi-dimensional compensator structure can be adaptively updated with simple arithmetic like averaging of error signals as opposed to complicated gradient descent, recursive least squares, or other similar adaptive algorithms. This allows for fast updates to the digital signal processing (DSP) to track parameters that quickly change, such as frequency-hopping applications using very minimal processing requirements. Updates do not require complicated matrix inversions or covariance matrix evaluations.

Figure 33:
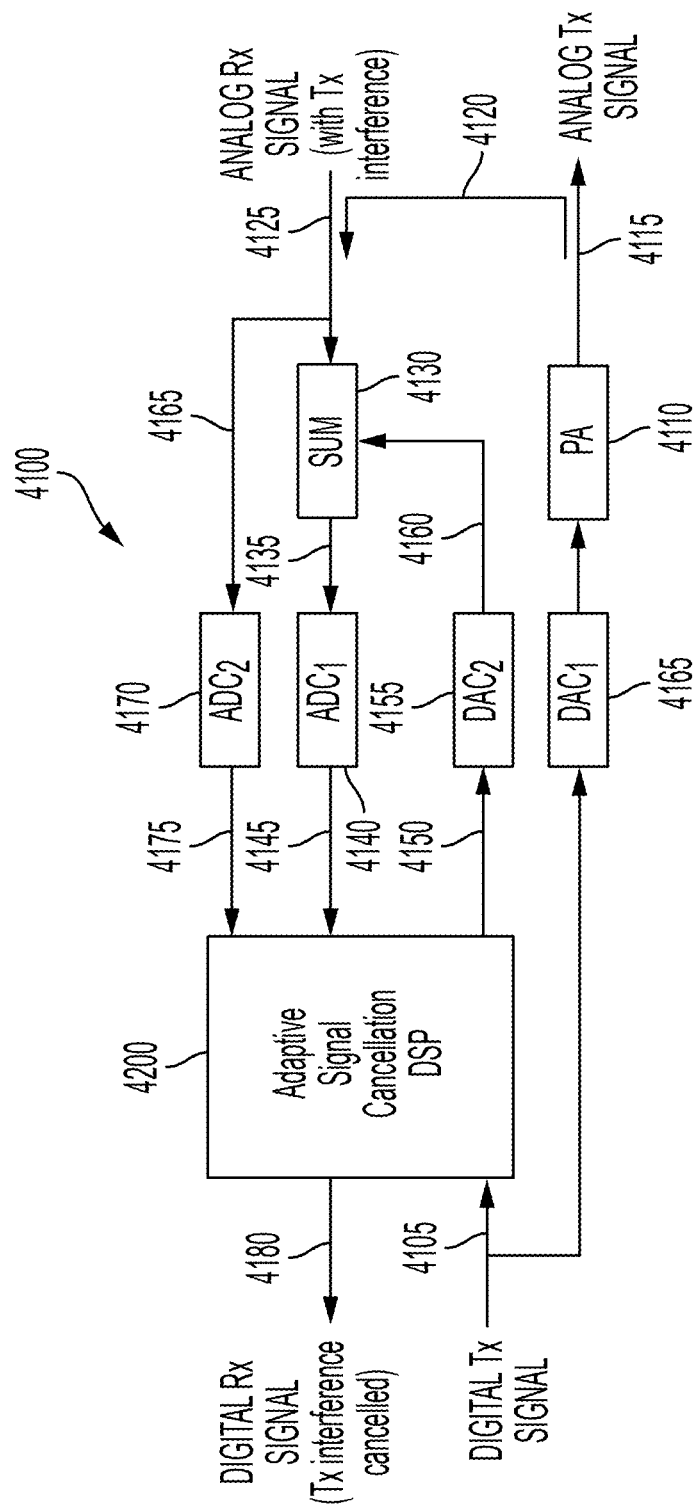
FIG. 33 illustrates a self-interference cancellation transceiver architecture.

FIG. 33 depicts a signal canceller transceiver architecture targeted for self-interference cancellation for simultaneous transmit and receive (STAR) applications according to an embodiment of the invention. The architecture includes a transmit chain for transmitting a digital transmit (Tx) signal 4105 with a first digital-to-analog converter (DAC) 4105 followed by an RF power amplifier (PA) 4110 to produce an analog Tx signal 4115. The architecture also includes a receiver chain with a first analog-to-digital converter (ADC) 4140 ostensibly to digitize the analog receive (Rx) signal 4125. However, in STAR applications, the analog Tx signal 4115 can often couple back (for example, via antenna coupling 4120) and interfere with the analog Rx signal 4125 as self-interference and possibly overload the ADC 4140. In other words, the analog Tx is added inadvertently to the analog Rx signal causing self-interference (wherein the coupled interference signal 4120 is the self-interference signal).

To combat this self-interference problem, an adaptive signal cancellation digital signal processing (DSP) algorithm 4200 is used to generate a digital cancellation signal 4150 that is converted to analog via a second DAC 4155 to produce an analog cancellation signal 4160. This analog cancellation signal 4160 represents an out-of-phase version of the coupled interference signal 4120. When combined with the analog Rx signal 4125 via the summer 4130, the coupled interference signal 4120 is effectively canceled in the analog signal 4135 feeding the receiver ADC 4140, thereby eliminating the self-interference.

Optionally, a second ADC 4170 is used to digitize the analog Rx signal 4125 without cancellation of the self-interference signal Tx to provide a digitized Rx signal with Tx interference 4175. This signal 4175 is used to enhance the operation of the adaptive signal cancellation DSP algorithm 4200.

As described in more detail below, one of the functions of the adaptive signal cancellation DSP algorithm 4200 is to adjust the digital Tx signal 4105 to generate the digital cancellation signal 4150 that optimally cancels the self-interference signal 4120 in the received signal 4145. The algorithm 4200 adaptively adjusts the frequency-dependent amplitude and phase of the digital cancellation signal 4150 to maximize the cancellation even over changing conditions, such as frequency, power level, time, temperature, and other dynamic conditions, the identification of which is apparent to one of ordinary skill in the art.

The adaptive signal cancellation DSP algorithm 4200 includes multiple layers of cancellation. The digitally assisted analog cancellation outlined above uses both linear and nonlinear modeling to more accurately represent the transfer function of the RF transmit chain than conventional fixed models. The novel augmentation of using nonlinear modeling enables a high-fidelity representation of the actual self-interference signal needed for high degrees of cancellation even with nonlinear electronics in the system.

Another layer of cancellation extracts the desired signal from the digitized received signal using digital source separation techniques. The three layers of cancellation (including linear modeling cancellation, nonlinear modeling cancellation, and digital source separation) combined typically provide 70-100 dB levels of cancellation. The digital Rx signal 180, therefore, represents an accurate digitized rendition of the analog Rx signal 4125 with the self-interference signal 4120 eliminated.

Modern wideband ADCs and DACs enable cancellation over wide instantaneous frequencies (e.g., greater than 1 GHz with commercial off-the-shelf parts) by leveraging polyphase filtering techniques for high data throughput.

Figure 34:
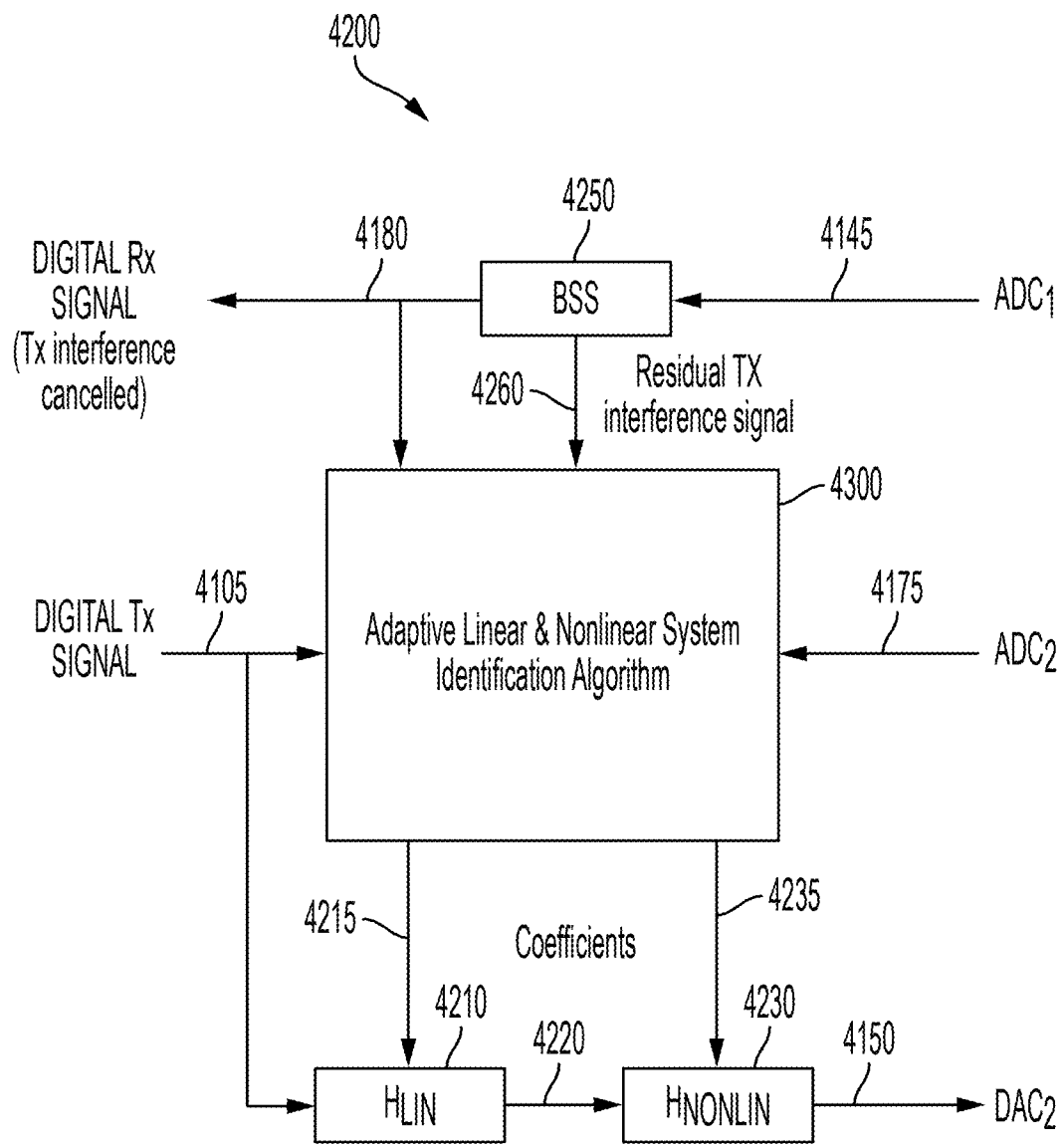
FIG. 34 illustrates an adaptive signal cancellation digital signal processing algorithm.

FIG. 34 depicts more details of the adaptive signal cancellation DSP algorithm 4200. The digital Tx signal 4105 is processed with a linear model 4210, such as a finite impulse response (FIR) filter, to create a first cancellation signal 4220. The first cancellation signal 4220 is further processed with a nonlinear model 4230, such as a Volterra filter or multi-dimensional model, to create the digital cancellation signal 4150. The received signal 4125 is processed with blind source separation algorithms 4250 to digitally separate and extract any remaining residual self-interference signals 4260 and the desired digital Rx signal 4180, as described in more detail below. The adaptive linear and nonlinear system identification algorithm 4300 monitors the residual interference signal 4260 to adaptively update the coefficients of the linear model 4210 and the nonlinear model 4230 to minimize the residual interference signal 4260. The system identification algorithm 4300 may optionally monitor other signals for enhanced operation, including the digital Rx signal 4145, the digital Rx signal with Tx interference canceled 4180, the digital Tx signal 4105, and the output signal 4175 from the optional second ADC 4170, as described in more detail below.

The linear model 4210 (e.g., a wideband FIR filter) models the frequency-dependent amplitude and phase (delay) of the chain of electronics from the digital Tx signal 4105 through the DAC 4165, PA 4110, coupling 4120, summer 4130, and ADC 4140 shown in FIG. 33. As described below, an adaptive system identification algorithm is used to fit the FIR filter coefficients to match this transfer function and adaptively update the model as the signal environment changes.

The novel use of nonlinear modeling enables accurate generation of the analog cancellation signal (including nonlinear distortion) to provide strong cancellation. In one exemplary embodiment of the invention, a Volterra nonlinear filter model is used for the nonlinear modeling. Electronic circuits such as the PA 4110 introduce nonlinear distortion. The distorted analog Tx signal 4115, y[n], is modeled as being generated by an $M^{th}$ order Volterra model that comprises the summation of M Volterra operations on the input signal, x[n], given by $$y[n] = \sum_{m=1}^{M} y_m[n] = \sum_{m=1}^{M} \langle H_m, x[n] \rangle \qquad (1)$$

where the $m^{th}$ order term is the tensor inner product between the $m^{th}$ order Volterra kernel, $h_m$, and the $m^{th}$ order tensor outer product of the input signal, x[n], given by $$\langle H_m, x[n] \rangle = \sum_{k_1=1}^{K} \sum_{k_2=1}^{K} \cdots \sum_{k_M=1}^{K} h_m[k_1 k_2, \ldots, k_M] \prod_{i=1}^{M} x[n - k_i - 1] \qquad (2)$$

where K represents the memory of the system. The order M is chosen based on the observed order of nonlinearity in the system. A $5^{th}$ order model is generally enough for a wide range of architectures over a wide bandwidth. The nonlinear filter coefficients $h_m$ are mathematically optimized to match the measured nonlinear distortion of the analog transmit chain such that the output 4160 of the second DAC closely matches the actual analog Tx signal 4115, including its nonlinear distortion.

As an aside, note that a first-order Volterra filter is equivalent to a linear finite impulse response (FIR) filter, so both the linear and nonlinear modeling described above can be implemented with a Volterra filtering architecture.

As described above, the Volterra 4230 filters are applied to the digital Tx signal 4105 to create the output signal 4150, which feeds the second DAC 4155, whose analog output 4160 is subtracted (via the RF summer 4130) from the analog Rx signal 4125 to cancel the analog Tx signal that has coupled back to the receiver input (i.e., signal 4120). The RF summer 4130 output 4125 is digitized by the first ADC 140.

Referring to FIG. 34, the output 4145 of the first ADC 4140, y(n), includes a combination of the desired analog Rx signal 4125, r(n), and a residual error signal e(n), which represents any remaining analog Tx signal 4115 that may not have been fully canceled via the RF summer 4130. To enhance self-interference rejection, an accurate estimate of the residual error, e(n), is needed so that it can be digitally subtracted. This need for isolating the error signal from the mixture of generally unknown received signals falls under the Blind Source Separation (BSS) class of problems. Specifically, given N observations of the mixture of signals, and at the k-th observation, $$y_k(n) = a_{k,1} e(n) + a_{k,2} r(n) \qquad (3)$$

we would like to estimate e(n) and r(n) with minimal a-priori knowledge on the signals.

Combining all N observations, we can formulate the below linear matrix equality $$y(n) = Ax(n) \qquad (4)$$

where:

$$y(n) = [y_0(n) \; y_1(n) \; \ldots \; y_{N-1}(n)]^T \qquad (5)$$

$$x(n) = [e(n) \; r(n)]^T \qquad (6)$$

$$A = \begin{bmatrix} a_{0,1} & a_{0,2} \\ \vdots & \vdots \\ a_{N-1,1} & a_{N-1,2} \end{bmatrix} \qquad (7)$$

Assuming the self-interference e(n) and received signal r(n) are statistically independent, they are simultaneously recovered through Independent Component Analysis (ICA). To apply ICA, the data matrix must be preprocessed by first removing the mean and then whitening the result. The solution for x(n) is then reduced to find an inverse matrix W such that $$x(n) = Wy(n) \qquad (8)$$

Several readily available algorithms can be employed, such as FastICA.

The signal r(n) is the digital Rx signal (with Tx interference canceled) 180. The Tx interference is first canceled with the digitally assisted analog cancellation using linear and nonlinear modeling described above; then, any residual Tx interference is removed using BSS techniques.

Figure 35:
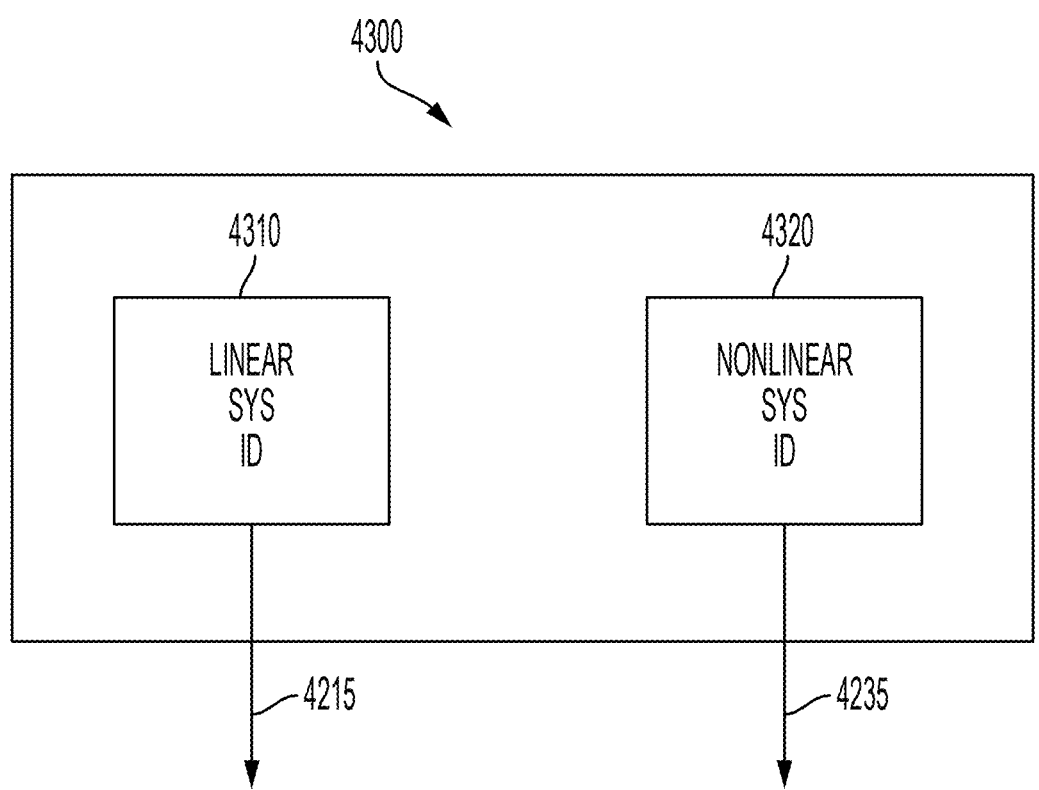
FIG. 35 illustrates an adaptive linear and nonlinear system identification algorithm.

FIG. 35 depicts the adaptive linear and nonlinear system identification algorithm 300, which is used to estimate the coefficients of a Volterra filtering model, including both wideband linear system identification 4310 (for identifying the linear filter coefficients 4215) and nonlinear system identification 4320 (for identifying the nonlinear filter coefficients 4235). Adaptive system identification algorithms use measurements of the input and output signals of a system to estimate coefficients of a transfer function (linear or nonlinear) that closely approximates the actual system. The algorithm continuously operates in the background and can track systems that change over frequency, time, temperature, etc.

The adaptive system identification algorithm 4300 shown in FIG. 34 iteratively estimates the coefficients 4215 of the linear model 4210, $H_{LIN}$, and the coefficients 4235 of the nonlinear model 4230, $H_{NONLIN}$, to accurately match the transfer function and thereby minimize the level of the interference signal 4120 seen in the digitized receive signal 4145.

Referring to FIG. 33, in one embodiment of the present invention, the unknown system's input signal is the digital Tx signal 4105, and the unknown system's output the analog Tx signal 4115. The digital Tx signal 4105 is known, and the analog Tx signal 4115 can be determined by subtracting the digital Rx signal (with Tx interference canceled) 4180 from the digitized analog Rx signal (with Tx interference), which corresponds to the output signal 4175 of the optional second ADC 4170.

In a preferred embodiment, an offline calibration in a controlled environment is first performed to provide a coarse calibration of the signal canceller system 4100. During this process, the second DAC 4155 is disabled such that its output 4160 is zero. The calibration is performed at a time when no analog Rx signals 4125 are present. Known test signals are then applied to the input digital Tx signal 4105 (for example, a pseudo-random signal spanning the desired bandwidth). The known digital Tx signals 4105 represent the input signals to the adaptive system identification algorithms 4300, and the digitized received signal 4145 represents the output signals for the algorithms 4300. The system identification algorithms 4300 then provide the initial, coarse estimates of the linear 4210 and nonlinear 4230 models. Note that this preferred embodiment does not need the second ADC 4170.

Also, in a preferred embodiment, the background adaptive linear and nonlinear system identification algorithms 4300 can be configured and arranged to iteratively adjust the linear 4210 and nonlinear 4230 models to minimize the correlation of the digital Tx signal 4105 with the digitized received signal 4145. This process is performed in the background during the normal functioning of the system to track and optimize dynamically changing signals and environments. The digitized received signal 4145 will include both the coupled interference signal 4120 and the desired analog Rx signal 4125; the coupled interference signal 4120 will be strongly correlated with the digital Tx signal 4105 and weakly correlated with the analog Rx signal 4125. Therefore, the correlation measurement will provide an accurate measurement of the level of residual interference still present in the digitized received signal 4145. The adaptive system identification algorithms 4300 finely tune the linear model 4210 and nonlinear model 4230 to minimize this correlation and therefore maximize the cancellation of the interference. Note that this preferred embodiment also does not need the second ADC 4170.

Figure 36:
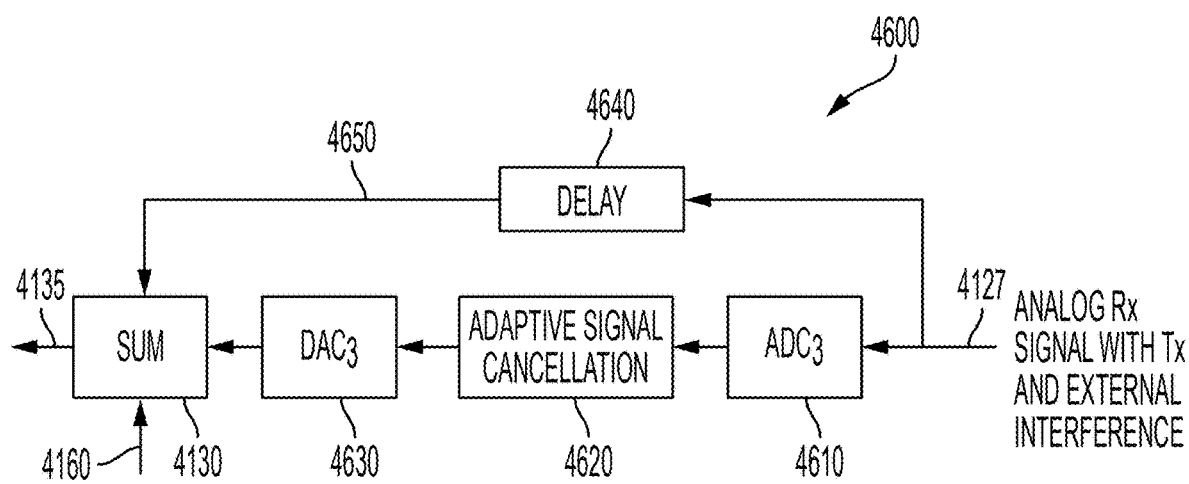
FIG. 36 illustrates an external signal cancellation augmentation.

FIG. 36 depicts an augmentation to the architecture to cancel unknown external interference (as opposed to known self-interference). An additional input is added to the summer 4130 shown in FIG. 33 to simultaneously cancel the self-interference and the external interference. As shown in FIG. 36, the analog Rx signal 4127 with both Tx self-interference and external interference is digitized with a third ADC 4610. Adaptive signal cancellation digital signal processing 4620 is applied to the output of the third ADC 4610 and is converted back to analog via a third DAC 4630. The analog Rx signal 4127 is delayed (via an analog delay line 4640) to account for the processing delay of the adaptive signal cancellation DSP 4620. The adaptive signal cancellation DSP 4620 adjusts the amplitude and phase of the output of the third ADC 4610 such that large interfering signals are canceled in the analog summer output 135. This architecture and technique for adaptive signal cancellation are described, for example, in U.S. Pat. No. 7,782,235, entitled "Adaptive mismatch compensators and methods for mismatch compensation," the disclosure of which is incorporated herein by reference.

In an alternate embodiment of the augmentation to the architecture to cancel unknown external interface, the third DAC 4630 shown in FIG. 36 is not used and its function is instead performed by the existing second DAC 4155 shown in FIG. 33. This does not materially affect the performance of the system and eliminates the need to use a third DAC 4630.

Referring to FIG. 33, in some applications, the self-interference will manifest itself as multipath reflections, causing multiple delayed copies of the analog Tx signal 4115 to be present in the coupled interference signal 4120. In these cases, multiple appropriately delay and scaled copies of the digital Tx signal 4105 can be digitally summed together to form a composite cancellation signal 4150. These types of echo cancellation algorithms are readily apparent to one of ordinary skill in the art.

Referring to FIG. 34, the linear model 4210, $H_{LIN}$, and nonlinear model 4230, $H_{NONLIN}$, can be implemented, for example, as Volterra filters or alternatively using models based on the multi-dimensional compensator.

The Volterra kernels can be factored by implementing only the dominant diagonals and off-diagonals of Volterra kernel matrices. Often, the dominant energy in the Volterra kernel is concentrated on a few diagonals, so this factorization method can provide high accuracy with low computational complexity. A key to significantly reducing the complexity of implementing the Volterra filtering is to exploit the extreme symmetry inherent in the Volterra kernels, namely, $h_m[k_1, k_2, \ldots, k_m]$ are identically equal for all permutations of $[k_1, k_2, \ldots, k_m]$. This dramatically reduces the implementation complexity from $K^m$ total coefficients to $$\binom{K+m-1}{m}$$

unique coefficients. For example, a fifth-order Volterra kernel (m=5) with memory K=8 has 32,768 total coefficients, of which 792 are unique (a reduction of over 97%).

The unique, symmetric coefficients correspond to the diagonal and upper off-diagonal coefficients of the multi-dimensional Volterra kernels (which are matrices for twodimensional kernels and tensors for higher-order kernels greater than second-order). Each diagonal and off-diagonal component can be efficiently implemented as an FIR filter. Each FIR filter can be rank-ordered by measuring the energy in each (e.g., the sum of the squares of the filter coefficients). To reduce the complexity of the implementation, an accurate approximation of the Volterra kernel can be implemented by retaining only the FIR filters with energy above a prescribed threshold.

Figure 11:
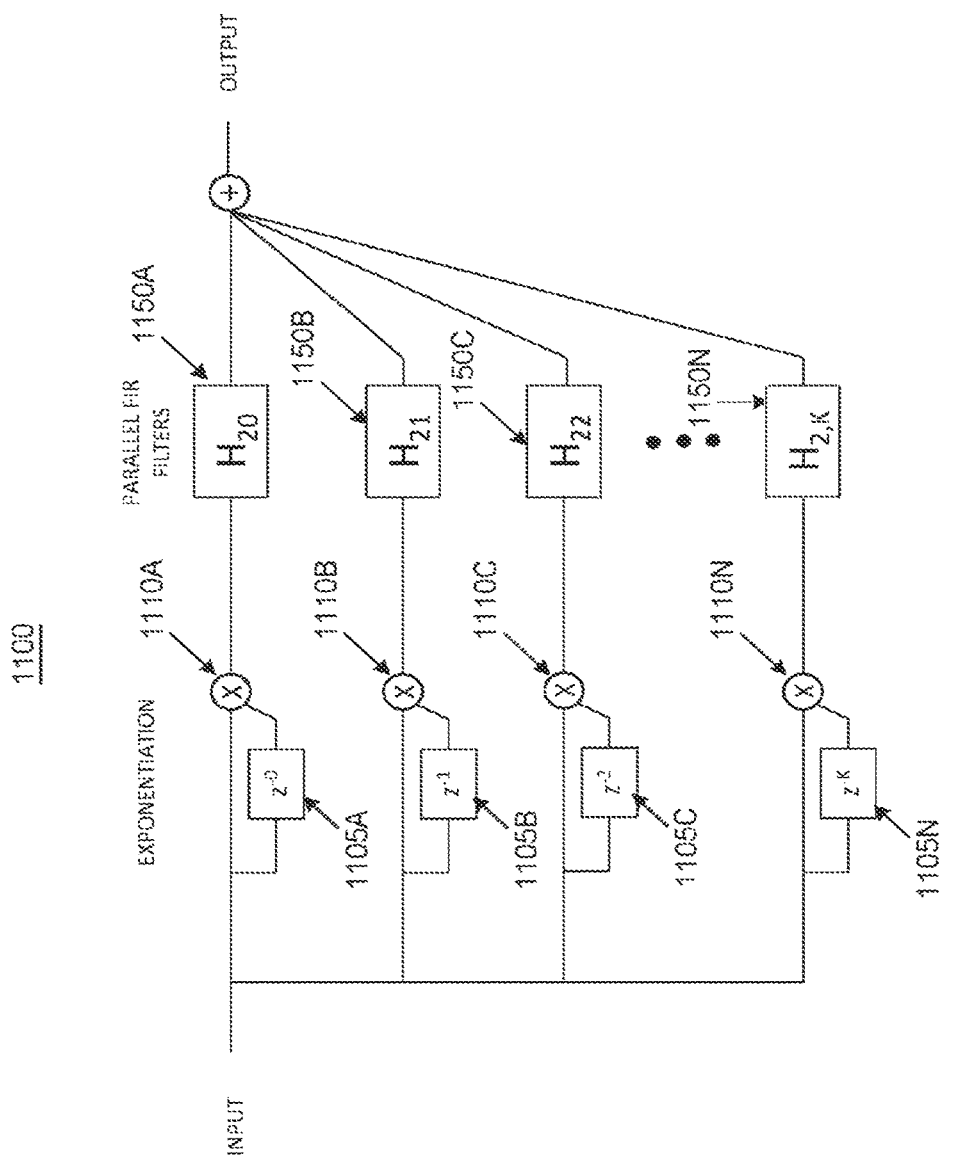
FIG. 11 illustrates the structure of the second-order factored Volterra compensator according to a preferred embodiment of the invention.

FIG. 11 depicts a preferred second-order Volterra kernel 1100 implemented with second-order exponentiators 1110A-N and parallel FIR filters 1150A-N. The parallel FIR filters correspond to the unique diagonal and upper off-diagonal coefficients of the Volterra kernel. The exponentiators 1110A-N are implemented with two-input multipliers whose inputs correspond to the Volterra filter input and a delayed version of the Volterra filter input using delays 1105A-N. The diagonal of the Volterra kernel corresponds to the case where the delay 1105A is zero, the first upper off-diagonal of the Volterra kernel corresponds to the case where the delay 1105B is one, and likewise for the other upper off-diagonals.

Figure 12:
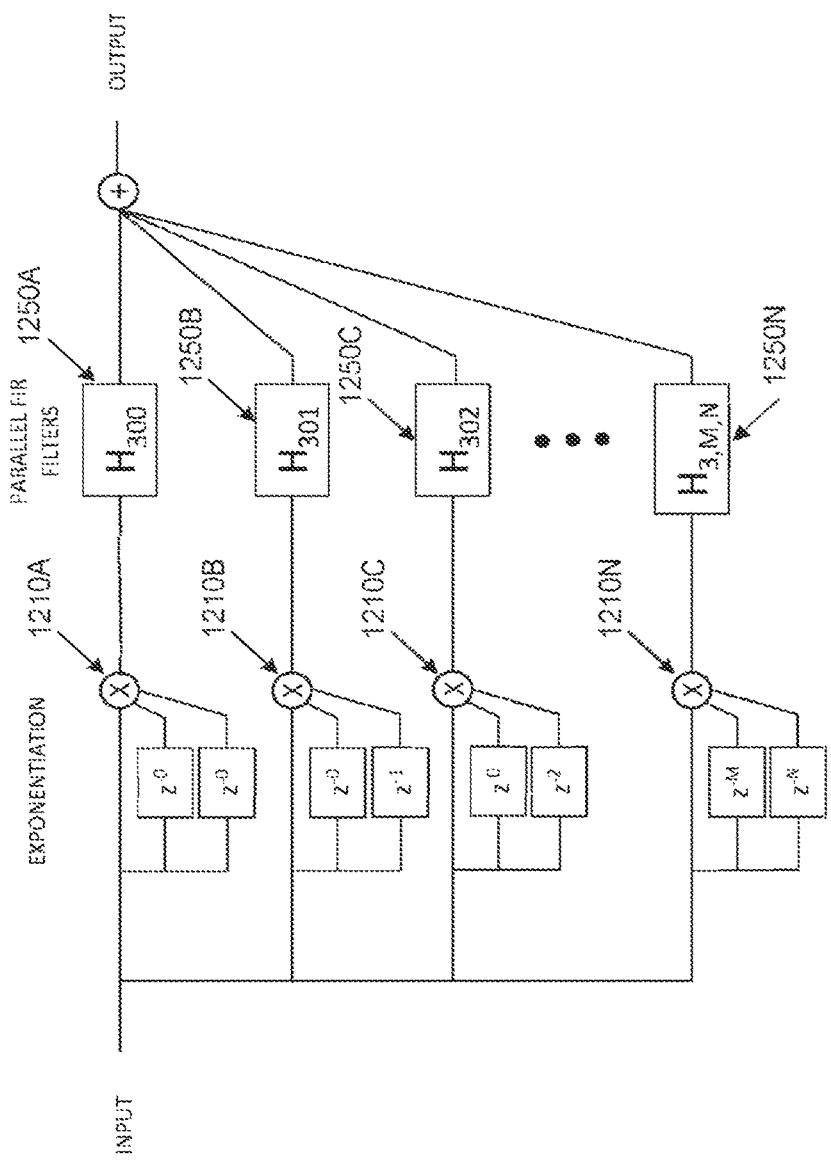
FIG. 12 illustrates the structure of the third-order factored Volterra compensator according to a preferred embodiment of the invention.

Similarly, FIG. 12 depicts a preferred third-order Volterra kernel implemented with third-order exponentiators 1210A-N and parallel FIR filters 1250A-N. Again, the parallel FIR filters correspond to the unique diagonal and upper off-diagonal coefficients of the Volterra kernel. The exponentiators 1210A-N are implemented with three-input multipliers whose inputs correspond to the Volterra filter input and delayed versions of the Volterra filter. This same structure is readily extended to higher-order Volterra kernels for similarly efficient implementations of arbitrary order Volterra filters.

Figure 7:
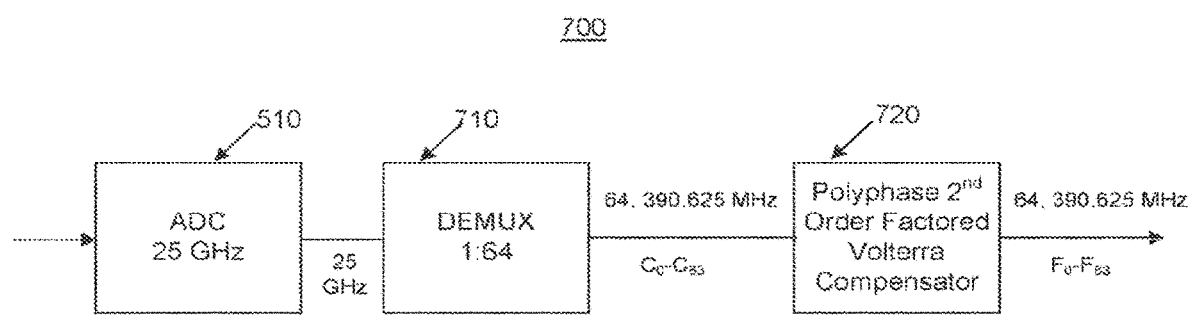
FIG. 7 illustrates the second-order factored Volterra compensator operating in a parallel polyphase configuration according to an exemplary embodiment of the invention.
Figure 8:
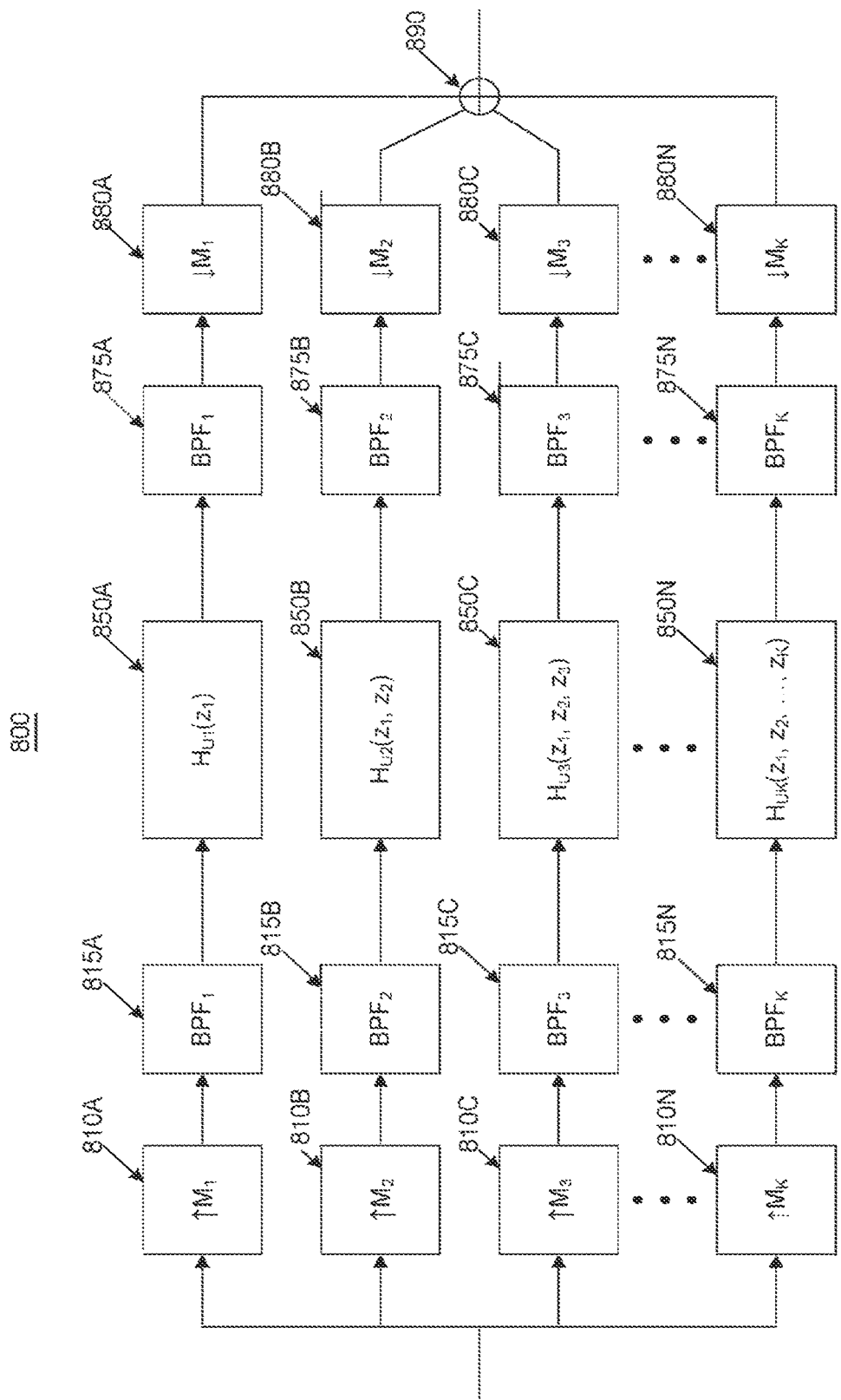
FIG. 8 illustrates a block diagram of a multi-rate Volterra compensator according to an embodiment of the invention.
Figure 9:
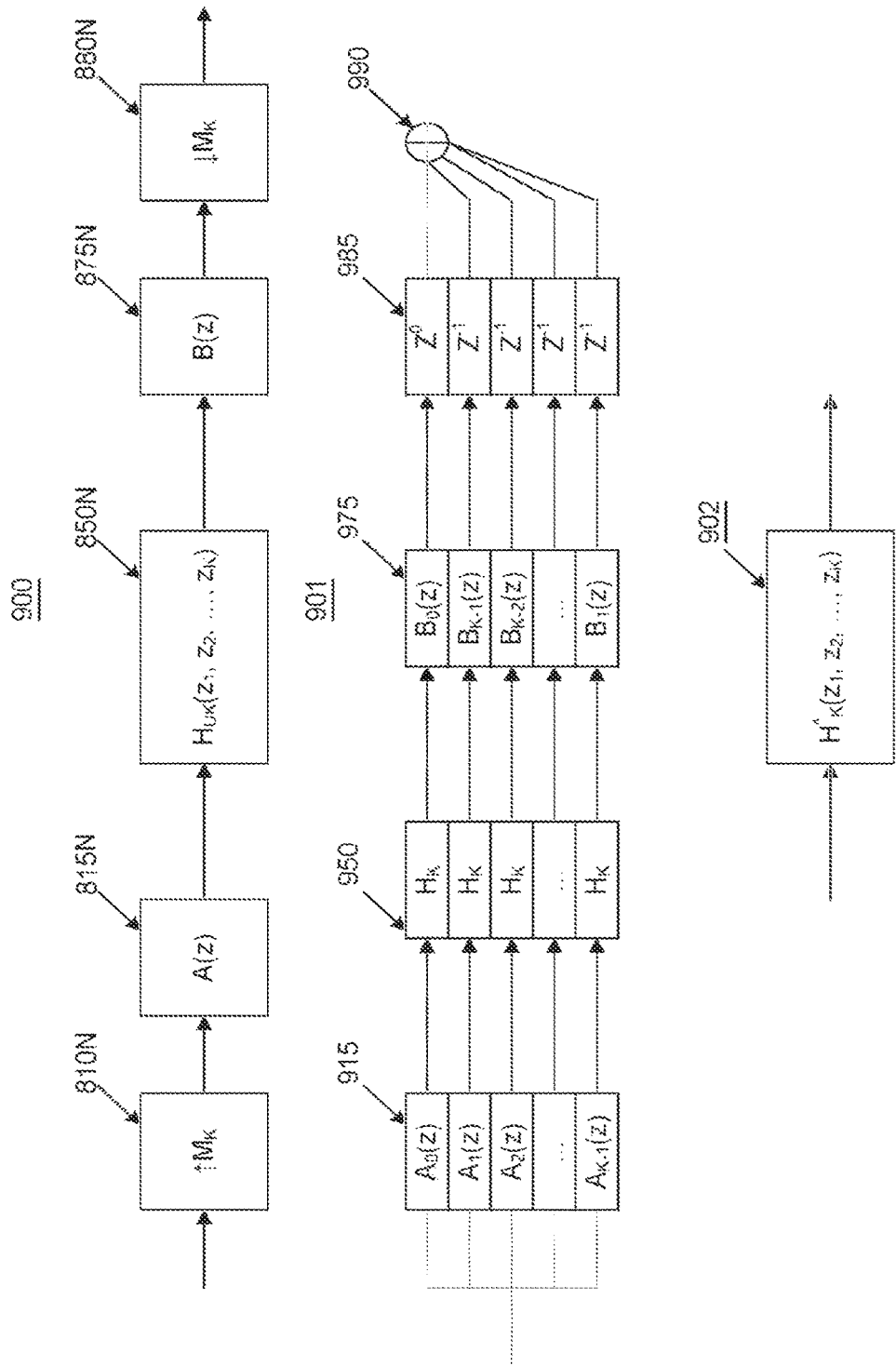
FIG. 9 illustrates a block diagram of a polyphase Volterra compensator and equivalent Volterra compensator according to embodiments of the invention.
Figure 10:
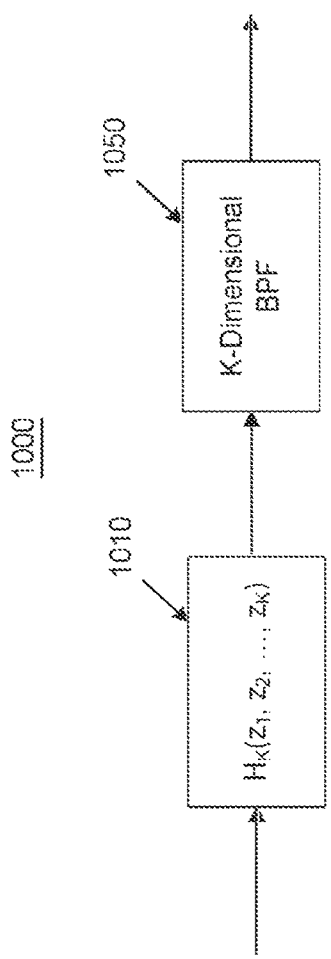
FIG. 10 illustrates a block diagram of a Volterra compensator with a K-dimensional bandpass filter according to an embodiment of the invention.

For very wideband applications, the second-order FIR filters 1150A-N in FIG. 11 can be implemented as previously described and shown in FIG. 7 in a parallel polyphase configuration 700 at a significantly reduced sample rate. Without this parallelization of the processing into numerous lower data rate paths, the extremely fast data rate would be beyond the capabilities of realizable hardware, such as digital signal processors (DSP), field programmable gate arrays (FPGA), or application specific integrated circuits (ASIC). Such parallelization may be implemented, for example, as polyphase finite impulse response (FIR) filters, the implementation of which is readily apparent to one of ordinary skill in the art. The third-order FIR filters 1250A-N in FIG. 12 and higher-order FIR filters (not shown) can be similarly implemented in a parallel polyphase configuration.

Once the Volterra kernels have been factored, they are rank ordered according to their significance (e.g., their singular values, Tucker factors, or other measurement of the relative energy in the Volterra kernel). Factored components are progressively included in the implementation until a desired level of performance or computational complexity limit has been reached. Once the Volterra kernels have been decomposed into their dominant factors, the compensation system for weakly nonlinear systems (i.e., a system where the nonlinear distortion is much, much smaller than the fundamental signals) is implemented by negating the Volterra kernels above the first order. The first order term passes the fundamental signal through the compensator in phase, and the kernels above the first order are negated such that they are subtracted from the output, thereby canceling the nonlinear distortion.

Figure 13:
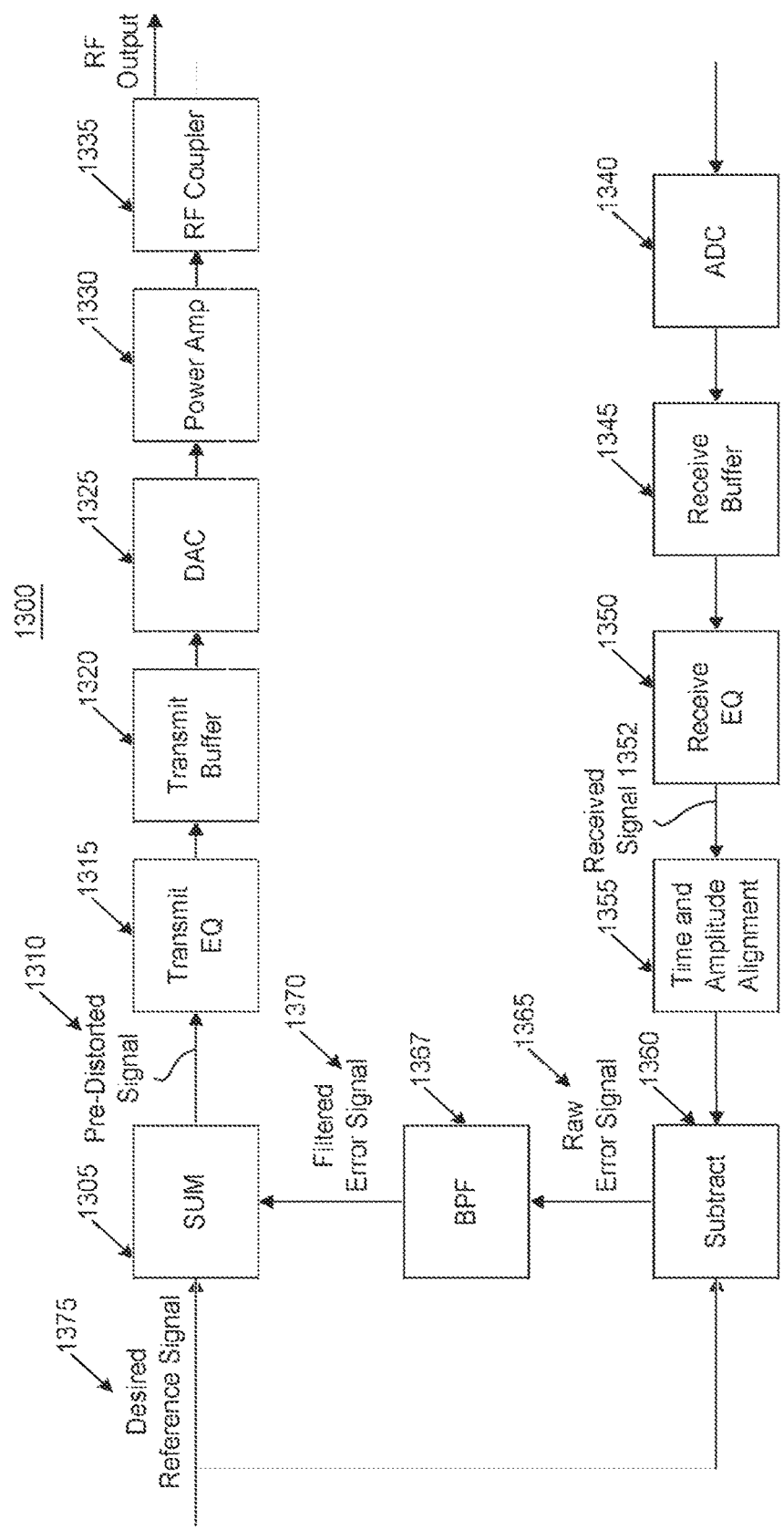
FIG. 13 illustrates a compensator calibration system.

To determine the appropriate Volterra kernel for a strongly nonlinear system (i.e., a system where the nonlinear distortion is roughly the same order as the fundamental signals), a preferred embodiment of the invention uses an iterative calibration algorithm 1300 to converge to a suitable result, as shown in FIG. 13. The iterative algorithm uses a series of multi-tone calibration signals with frequencies appropriately chosen to avoid overlapping distortion components, as described previously. Other non-sinusoidal signal types, such as pseudo-random, bandpass, spread spectrum or other modulated waveforms may also be used with this method.

During system calibration for a strongly nonlinear pre-compensation system such as digital pre-distortion of RF power amplifiers, for each calibration signal, the desired signal 1375 is iteratively adjusted to create a pre-distorted signal 1310 such that, when distorted by the RF power amplifier 1330, the output of the power amplifier 1330 closely matches the desired signal 1375.

The desired signal 1375 is digitally generated (e.g., on a computer or in an in- system embedded processor) and, on the first iteration of the algorithm, stored in a transmit buffer memory 1320 and converted to an analog signal with a digital-to-analog converter 1325. This signal is amplified by the RF power amplifier under test 1330 and the amplifier output is coupled with an RF coupler 1335 to an analog-to-digital converter 1340. The analog-to-digital converter output is captured in receive buffer memory 1345. The received signal 1352 accurately represents the output of the RF power amplifier 1330. The gain and delay of the received signal 1352 is adjusted in block 1355 (described further below) and compared to the desired signal 1375 via subtraction 1360 to create error signal 1370. On the second and subsequent iterations of the algorithm, the error signal 1370 is added to the desired signal 1375 with summer 1305 to create a new pre-distorted signal 1310. The process is repeated until the level of the error signal 1370 is below a prescribed threshold, indicating that the algorithm has converged to an appropriate solution. Once this occurs, both the desired signal 1375 and the final pre-distorted signal 1310 are saved in memory and the process is optionally repeated for another calibration signal.

The time and amplitude alignment block 1355 includes a digital gain element (e.g., a digital multiplier) to compensate for the gain of the RF power amplifier and a delay adjustment (e.g. delay elements) to compensate for the time delay of the DAC 1325 and transmit electronics (not shown), RF power amplifier 1330, RF coupler 1335, ADC 1340, and receive electronics (not shown).

The iterative calibration algorithm shown may optionally include a DAC equalization filter 1315 to compensate for any amplitude and phase distortion caused by the digital-to-analog converter and associated transmit electronics. The transmit electronics may include RF filters or mixers (not shown) to change the frequency of the transmitted signal. The algorithm may also optionally include an ADC equalization filter 1350 to compensate for any amplitude and phase distortion caused by the analog-to-digital converter and associated receive electronics. The receive electronics may include RF filters or mixers (not shown) to change the frequency of the received signal. The algorithm may optionally include a bandpass filter 1367 to limit the bandwidth of the correction signal to a prescribed frequency band.

Once the iterative algorithm has been used with a multiplicity of calibration signals, the saved sets of corresponding desired signals 1375 and pre-distorted signals 1310 are used with the harmonic probing process previously described to determine the appropriate Volterra kernel or kernels. These Volterra kernels represent the pre-inverse Volterra filters that effectively compensate for the nonlinear distortion of a system such as an RF power amplifier. These Volterra filters can be efficiently implemented in hardware using the factorization techniques previously described.

The aforementioned approach, while providing excellent linearization in a calibrated laboratory environment, will yield sub-optimal performance when employed in the field due to a variety of changing conditions, such as temperature. By design, the above approach requires apriori fitting in order to learn the Volterra model necessary to effectively compensate the nonlinear distortion present. As a result, such a system requires a great deal of data in the calibration stage to attempt to capture the variety of conditions experienced in the hardware. The following approach, however, eliminates the need for a calibration stage by positing an adaptive approach to cancel out nonlinearities.

The present invention provides a dynamic or "on the fly" process of adaptively estimating a Volterra model predistortion linearizer for a nonlinear system without the need for any a prfori model fitting. While the following derivation is shown for a third-order system, one of ordinary skill in the art can readily appreciates that it can be extended to higher orders.

Figure 14A:
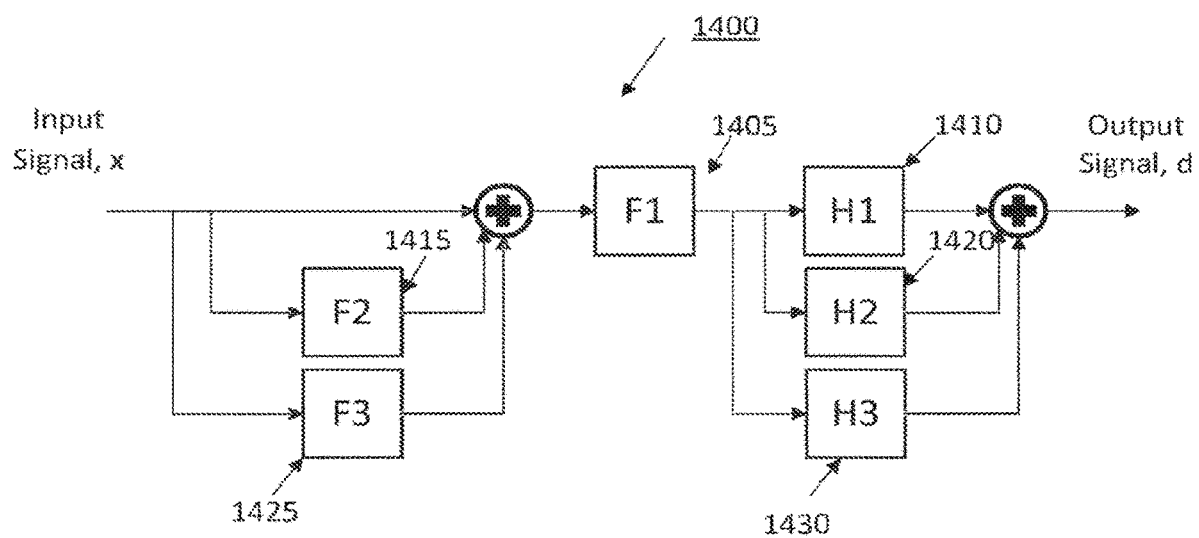
FIG. 14A illustrates an adaptive estimation of third-order factored Volterra predistortion linearizer for a nonlinear system according to an embodiment of the invention.

FIG. 14 illustrates an adaptive estimation 1400 of a third-order Volterra predistortion linearizer for a nonlinear system according to an embodiment of the invention. H1-H3 represent a third-order Volterra nonlinear system comprising first-order Volterra kernel 1410, second-order Volterra kernel 1420, and third-order Volterra kernel 1430. F1-F3 represent a third-order Volterra predistortion linearizer comprising first-order inverse Volterra kernel 1405, second-order inverse Volterra kernel 1415, and third-order Volterra kernel 1425. The inverse Volterra kernels 1405-1425 receive an input signal, x, and, once processed through the Volterra nonlinear system represented by Volterra kernels 1410-1430, produce the output signal, d, such that the nonlinearities have been cancelled.

The nonlinear device being linearized, such as an RF power amplifier, is mathematically modeled as a Volterra nonlinear system comprising Volterra kernels 1410-1430 using an adaptive estimation algorithm described below. These Volterra kernels 1410-1430 are then used to calculate the corresponding inverse Volterra kernels 1405-1425 to cancel the nonlinear distortion introduced by the nonlinear device in a process also described below.

In a preferred embodiment, the inverse Volterra kernels 1405-1425 can be implemented in hardware for real-time processing as a second-order Volterra kernel 1100 shown in FIG. 11 and third-order Volterra kernel shown in FIG. 12. For very wideband applications, the kernels can be implemented as previously described and shown in FIG. 7 in aparallel polyphase configuration 700 at a significantly reduced sample rate.

In another embodiment, the actual inverse Volterra filters 1405-1425 are implemented in real-time hardware such as FGPA as shown in FIG. 11 and FIG. 12 (with polyphase filtering shown in FIG. 7). The Volterra kernels 1410-1430 are not implemented but instead are interim calculations used to determine the inverse Volterra filters 1405-1425. The optimal inverse of an $N^{th}$ order Volterra system is defined as:

$$Y_N = Y_1 - F_1 \sum_{k=2}^{N} H_K Y_{N-k+1}, \text{ where } Y_1 = F_1 * x \text{ and } F_1 = \frac{1}{H_1}$$

Iteratively computing this compounds the effects of F1, which requires a good estimate of H1. By predistorting the system with F1, the presence of H1 is effectively cancelled out and a new system is produced where the inverse does not depend on H1 (nor does it depend on a need to estimate it):

$$Y_N = x - \Sigma_{k=2}^{N} H_K Y_{N-k+1}$$

For a third-order system:

$$Y_3 = x - H_2 Y_2 - H_3 Y_1 = x - H_2 * x - H_3 * x + H_2 * (H_2 * x)$$

The last term will generally produce higher order terms that will be smaller than the nonlinearity to be removed, so this term can be omitted to yield:

$$Y_3 = x - H_2 * x - H_3 * x = x + F_2 * x + F_3 * x$$

This is the system modeled by F2 and F3. Although only a single iteration is depicted in FIG. 14, F2 and F3 are iteratively estimated as the system is predistorted.

To estimate the approximate inverse F1 (or $1/H_1$), the system is proved with low amplitude signal tone signals across the whole Nyquist band, the output is measured, and F1 is recorded as the quotients of the frequency response of the input signal and frequency response of the output signal. These measurements are interpolated and then used for the design of the FIR filter. Once the inverse of H1 is estimated, the system is predistorted with it in order to estimate the pseudo-inverse, F1.

For each iteration, 1420 (H2) and 1430 (H3) are estimated via a modified recursive least squares (RLS) algorithm. The standard RLS algorithm steps are described by equations 1-6 and the inventive steps are described by equations 7-9 as follows. For N iterations, compute the following:

$$k(n) = \frac{\lambda^{-1} P(n-1) u(n)}{1 + \lambda^{-1} u^H(n) P(n-1) u(n)} \quad \text{(equation 1)}$$

$$y(n) = w^T(n-1) u(n) \quad \text{(equation 2)}$$

$$e(n) = d(n) - y(n) \quad \text{(equation 3)}$$

$$w(n) = w(n-1) + k(n) e(n) \quad \text{(equation 4)}$$

$$P(n) = \lambda^{-1} P(n-1) - \lambda^{-1} k(n) u^H(n) P(n-1) \quad \text{(equation 5)}$$

$$mse = e(n) * e(n) \quad \text{(equation 6)}$$

$$mse10(n) = \frac{1}{10} \sum_{k=n-9}^{n} mse(k) \quad \text{(equation 7)}$$

$$mse100(n) = \frac{1}{100} \sum_{k=n-99}^{n} mse(k) \quad \text{(equation 8)}$$

$$\text{if}(mse10(n) - mse100(n) > 5 \text{ dB}), \text{ reset } P(n) \text{ to } I \quad \text{(equation 9)}$$

where $\lambda^{-1}$ denotes the reciprocal of the exponential weighing factor (also called the forgetting factor), n is the current time index, u(n) is the vector of input samples, P(n) is the inverse correlation matrix, k(n) is the gain vector, w(n) is the filter tap estimates of the vectorized Volterra coefficients, y(n) is the estimated output of the filter, e(n) is the estimation error, and d(n) is the desired output, mse(n) is the mean-squared error (MSE), mse10 is a 10-sample moving average of the MSE, mse100 is a 100-sample moving average of the MSE, and I is the identity matrix.

The standard RLS algorithm computes the mean-squared error sample-by-sample to find the optimal solution. However, in order to allow filtering to be incorporated into the model, the output of the system is estimated for the full data vector at each iteration. This provides a more robust and stable objective function than the sample-by-sample means-squared error computation. Once the MSE is computed for all N iterations, optimization over all coefficients is performed by choosing the coefficients that minimize the objective function of $$\min_k [std[d - y(k)]].$$

The system is then predistorted with the estimated F2 and F3, and the estimation is repeated until convergence. F2 and F3 are computed as the negated accumulation of the H2 and H3 estimates from previous iterations scaled by a convergence controlling factor, alpha. In other words:

$$F_2(n) = -a \sum_{i=1}^{n-1} H_2(i)$$

$$F_3(n) = -a \sum_{i=1}^{n-1} H_3(i)$$

Figure 14B:
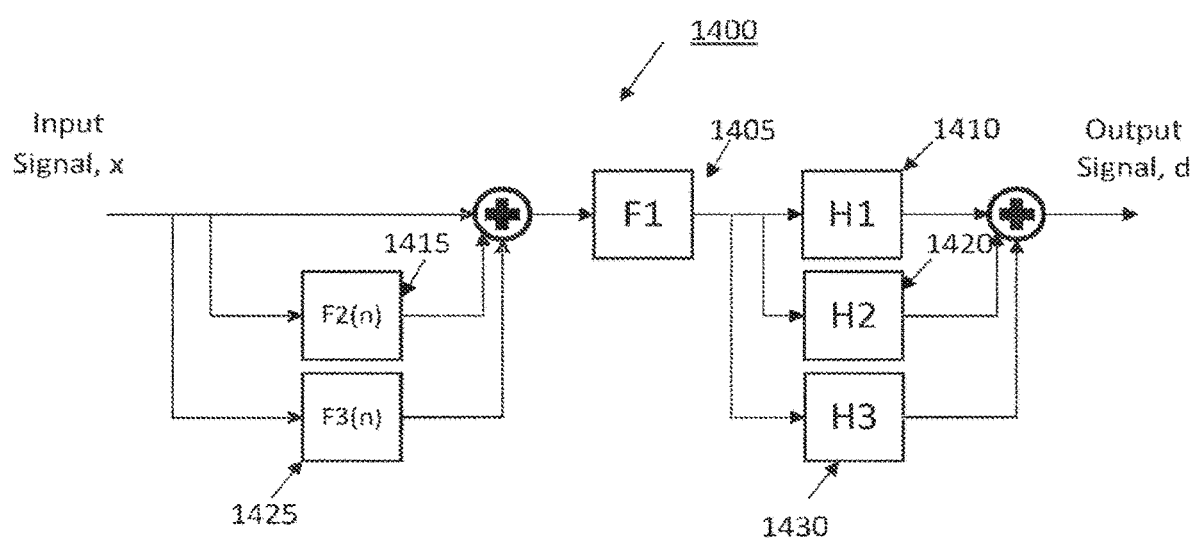
FIG. 14B illustrates an adaptive estimation of third-order factored Volterra predistortion linearizer for a nonlinear system at iteration n according to an embodiment of the invention.

FIG. 14B illustrates adaptive estimation 1400 of third-order factored Volterra predistortion for nonlinear system at iteration n according to an embodiment of the invention.

In a preferred embodiment, the adaptive estimation algorithm described above can be implemented as firmware in a processor such as a digital signal processor (DSP), embedded processor, or a microprocessor. For faster update rates, some of the computations can be implemented in dedicated hardware such as FPGA or ASIC logic. Furthermore, the implementation of the actual compensator in the FPGA is simply 1405-1425 (F1-F3) with its adder. The output of 1405 (F1) represents the predistorted signal which feeds the device being linearized (e.g., RF power amp) such that the output of the device, output signal d, is linearized (i.e., the nonlinear distortion is cancelled). The Volterra kernels 1410-1430 (H1-H3) with its adder is a mathematical model of the device with output signal d.

For bandpass systems in which the waveforms are limited to a certain sub-bandwidth, "prefiltering" the signal is effective since, without the prefiltering, the system is expecting components over a wider bandwidth. In an embodiment of the invention, a bandpass filter is used to filter the data to the desired bandwidth and this filter is included directly in the kernel estimation; the algorithm is able to concentrate on the desired inband signals while ignoring the out-of-band signals. A system that concentrates on the desired inband signals greatly simplifies the Volterra filter design algorithm (described above) and greatly reduces the size of the hardware implementation (since the many zero coefficients correspond to simple time delays instead of full multipliers).

While the present invention has been described for a predistortion linearization application (such as linearization of RF transmit electronics including RF power amplifiers or digital-to-analog converters), it will be readily apparent to one of ordinary skill in the art that the same principles can be applied to a post-distortion linearization application (such as linearization of RF receive electronics, including low noise amplifiers or analog-to-digital converters).

Figure 15:
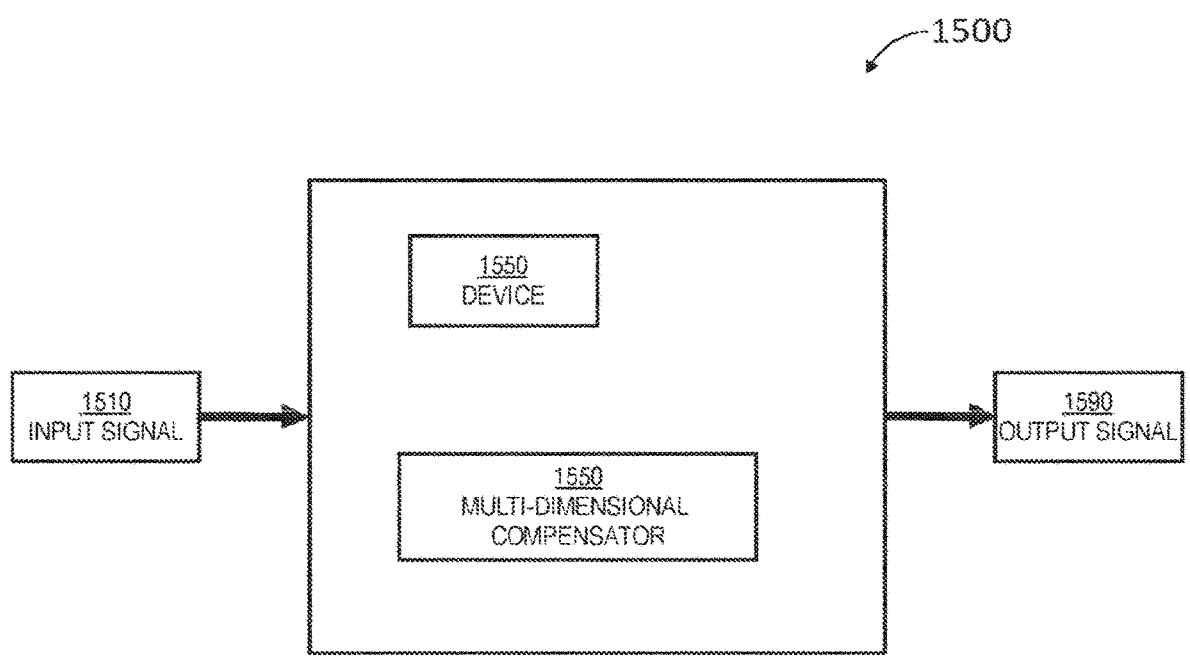
FIG. 15 illustrates a compensated system.

FIG. 15 illustrates a multi-dimensional compensation system 1500 of a device 1540 exhibiting distortion. Ideally, the system output signal 1590 is simply an amplitude-scaled and delayed version of the system input signal 1510. However, the device 1540 may introduce distortion components such as non-linear distortion, frequency-dependent amplitude and phase errors, in-phase and quadrature mismatch errors, time-interleaving mismatch errors, DC-offset distortion, or other distortion, the identification of which is apparent to one of ordinary skill in the art, that output signal 1590 is not simply an amplitude-scaled and delayed version of the input signal 1510. A multi-dimensional compensator 1550 is used to model these errors such that they can be canceled in the output signal 1590.

In a preferred embodiment of the invention, the multi-dimensional compensator 1550 is implemented in digital signal processing software, firmware, or hardware (or a combination of two or more of these implementations), the general implementation of which are apparent to one of ordinary skill in the art. Therefore, for devices 1540 that include conversion from analog signals to digital signals, the multi-dimensional compensator 1550 would be implemented after the device 1540 (referred to as "post-compensation"). Similarly, for devices 1540 that include conversion from digital signal to analog signals, the multi-dimensional compensator 1550 would be implemented before the device 1540 (referred to as "pre-compensation"). This is described more fully below with reference to FIG. 21 and FIG. 22.

Still referring to FIG. 15, the multi-dimensional compensator 1550 can be configured to operate on real or complex signals. Real signals are often used in direct sampled digital systems with no digital or analog RF upconversion or downconversion. Complex signals are used in systems that use downconversion mixers to frequency shift real RF signals to become complex (i.e., real and imaginary valued) baseband signals. The processing and architectures described herein function for real or complex signals. Complex processing can be performed in Cartesian coordinates (i.e., real and imaginary values) or polar coordinates (i.e., magnitude and phase values), the implementation of which is apparent to one of ordinary skill in the art.

Figure 16:
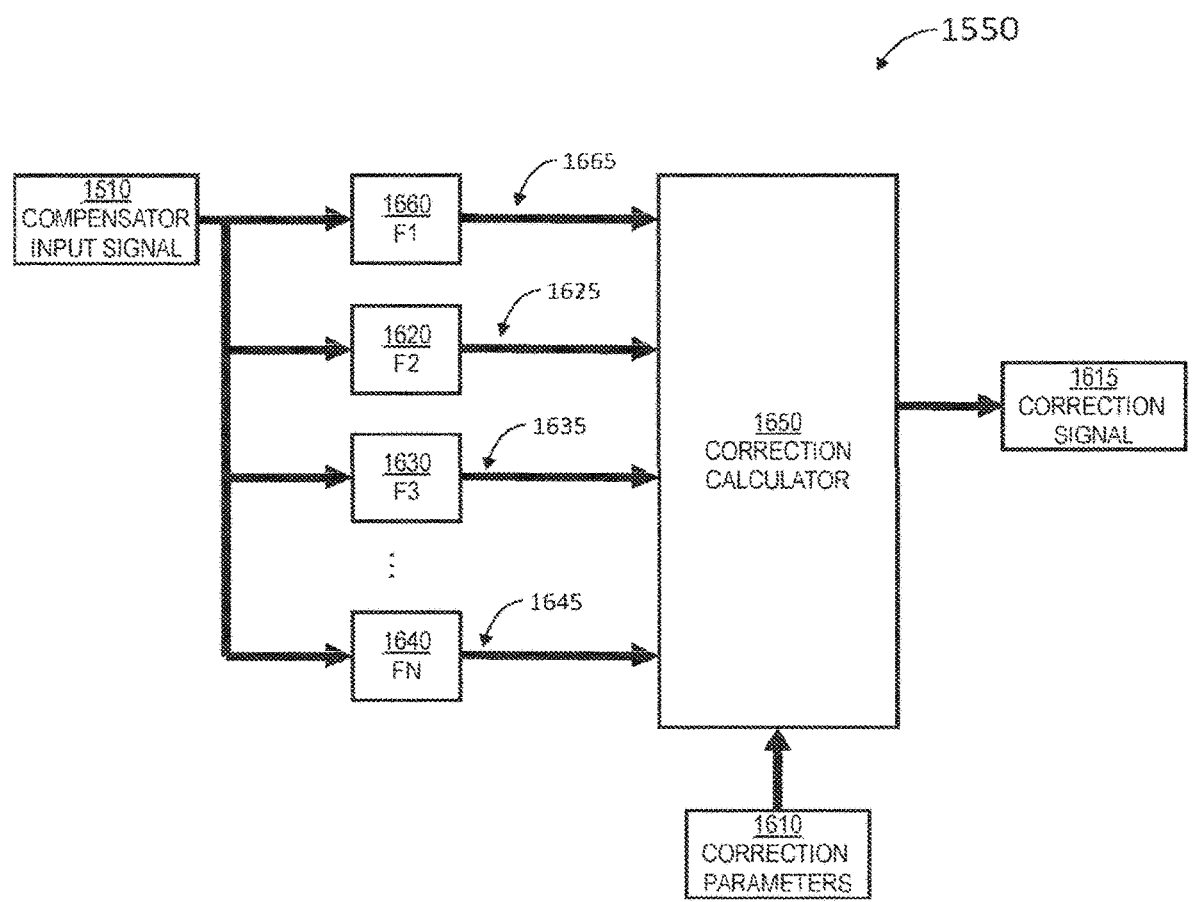
FIG. 16 illustrates a multi-dimensional compensator.

Referring to FIG. 16, the multi-dimensional compensator 1550 includes a correction calculator 1650. The multi-dimensional inputs to the multi-dimensional compensator 1550 include two or more functions 1660, 1620, 1630 and 1640 of the compensator input signal 1605. The correction calculator 1650 also takes as input a set of correction parameters 1610 which define the operation of the multi-dimensional compensator 1550. The correction parameters 1610 are described more fully below with reference to FIG. 22 and FIG. 23.

Still referring to FIG. 16, the functions $F_1$ 1660, $F_2$ 1620, $F_3$ 1630, and FN 1640 define the current state of the device such that the correction calculator 1550 can calculate a different correction value depending on the current state of the device. Here, N refers to the number of functions 1660, 1620, 1630, 1640 that are implemented in the multi-dimensional compensator 1550-N is also the number of dimensions of the multi-dimensional compensator 1550. To simplify discussion, only four functions 1660, 1620, 1630, and 1640 are described, i.e., N=4. However, N can be greater than 4. These functions 1660, 1620, 1630, and 1640 are implemented, for example, in a field programmable gate array (FPGA) or application specific integrated circuit (ASIC) to provide a corresponding output signal 1665, 1625, 1635, and 1645 based on mathematical operations on the compensator input signal 1605. In an embodiment of the invention, the multi-dimensional compensator 1550 is implemented in a digital signal processor. These functions 1660, 1620, 1630, and 1640 may include but are not limited to the following: present compensator input signal 1605 value; the delay function; the derivative function (including higher-order derivative); the integral function (including higher-order integrals); signal statistics (such as mean, median, standard deviation, variance); the covariance of the compensator input signal 1605 with delayed values of the compensator input signal 1605; the power of the compensator input signal 1605 (including the RMS and peak power measurements); and polynomial functions of the compensator input signal 1605. The function signals 1625, 1635, and 1645 provide additional information on the state of the device compared to just using the compensator input signal 1605 alone, which helps model and cancel distortion signals that vary, for example, as a function of frequency or exhibit other memory effects such as hysteresis. However, with reference to exemplary embodiment shown in FIG. 16, all functions 1620, 1630, and 1640 are derivative functions of various orders. Again, functions 1620, 1630, and 1640 can be functions other than derivatives as noted above.

Still referring to FIG. 16, in a preferred embodiment, the first differentiator function 1620 is used to calculate the first derivative of the compensator input signal 1605 to form the first derivative signal 1625. The first derivative corresponds to the rate of change (also referred to as the velocity) of the compensator input signal 1605. The second differentiator function 1630 is used to calculate the second derivative of the compensator input signal 1605 to form the second derivative signal 1635. The second derivative corresponds to the rate of change of the first derivative signal 1625 (also referred to as the acceleration of the compensator input signal 1605). The $M^{th}$ order differentiator function 1640 is used to calculate the $M^{th}$ derivative of the compensator input signal to form the $M^{th}$ derivative signal 1645. The implementation of the differentiators 1620, 1630, and 1640 is described more fully below with reference to FIG. 18A, FIG. 18B, and FIG. 18C. N can be any value. In this preferred embodiment, the function $F_1$ 1660 corresponds to the present compensator input signal 1605 value.

Still referring to FIG. 16, the correction calculator 1650 provides as output the correction signal 1615. As described more fully below with reference to FIG. 21 and FIG. 22, the correction signal 1615 is appropriately applied to the device 1540 to negate the distortion in the system output signal 1590; the correction signal 1615 is applied differently for a post-compensation system compared to a pre-compensation system.

Figure 17A:
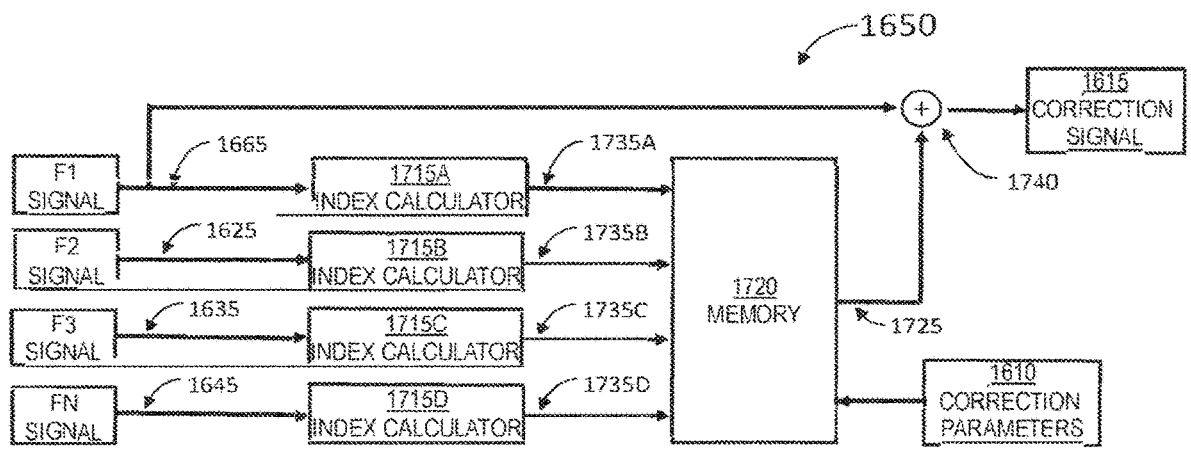
FIG. 17A illustrates a memory-based correction calculator.

In a preferred embodiment of the invention, FIG. 17A illustrates a memory-based implementation of a correction calculator 1650. A memory 1720 is used to store different correction values that are a function of the compensator input signal 1605 and one or more derivative signals 1625, 1635, and 1645. Index calculators 1715A, 1715B, 1715C, and 1715D translate the corresponding compensator input signal 1605 and derivative signals 1625, 1635, and 1645 into corresponding memory location indices 1735A-D. These indices define which location in the memory 1720 to provide the correction value 1725. The memory 1720 can be implemented in a software memory variable or in hardware, for example, as a random-access memory (RAM), the implementation of which are apparent to one of ordinary skill in the art. The correction value 1725 is summed using an adder 1740 with the compensator input signal 1605 to form the correction signal 1615.

As mentioned above, the index calculators 1715A-D translate the corresponding compensator input signal 1605 and derivative signals 1625, 1635, and 1645 into corresponding memory location indices 1735A-D. Being a digital signal processing system, the compensator input signal 1605 and derivative signals 1625, 1635 and 1645 are all quantized values. The level of quantization (as defined by the number of digital bits used to represent these values) is determined during the system design stage to have enough resolution to accurately represent the desired signals with minimal quantization error using design techniques apparent to one of ordinary skill in the art. A practical number of bits to implement for the $F_1$ output signal 1660 typically ranges from 8 to 12 bits for the $F_1$ output signal 1665 when the function $F_1$ 1660 is the present value function (i.e., when no function is used, such that the $F_1$ output signal 1665 equals the compensator input signal 1605). Otherwise, a practical number of bits to implement for function output signals 1660, 1620, 1630, and 1640 typically ranges from 4 to 8 bits. The memory location indices 1735A-D are also quantized, and the level of quantization of the indices defines how large (i.e., the number of memory entries) the memory 1720 is. Reducing the size of the memory 1720 is desirable to reduce the size, weight, and power of a hardware implementation.

Still referring to FIG. 17A, determining relevant system parameters such as which order derivatives N to use and the size of the memory 1720 can be performed with an experimental trade-off study. A trade space is defined for each of the system parameters, and for each different setting of the system parameters, the system is calibrated, and the performance is evaluated. Methods for system calibration and performance evaluation are described below. Once the performance has been evaluated for each of the system parameter settings, the designer is able to choose the implementation that provides the desired level of performance and the corresponding size. This can be used, for example, to determine which order derivatives to use, the number of quantization levels for the compensator input signal 1605, and the number of quantization levels for each of the derivative signals 1625, 1635, and 1645. In addition to the number of quantization levels, the type of quantization can also be evaluated. Uniform quantization divides the range of the signal into equal quantization steps, i.e., quantization levels are uniformly spaced. Conversely, non-uniform quantization divides the range of the signal into unequal quantization steps. i.e., quantization levels are unequal—relationship can be logarithmic. Rounding and truncation are typical examples of quantization processes, the identification and implementation of which are apparent to one of ordinary skill in the art. Smaller quantization steps can be allocated to areas where more performance is needed (for example, for large magnitude values of the compensator input signal 1605 where nonlinear compression effects are prominent) and larger quantization steps can be allocated to other areas (for example, small magnitude values of the compensator input signal 1605 where nonlinear compression effects are negligible). Non-uniform quantization can sometimes provide similar performance to uniform quantization, but with much fewer quantization levels, thereby reducing the size, weight, power, and cost of a hardware implementation.

The index calculators 1715A-D quantize their input signals to the number of quantization states as determined above. Each quantization state is assigned a unique value which represents the index of the memory. For example, if the system has been designed to use 16 values of the first derivative, then the index calculator 1715B will quantize first derivative signal 1625 into 16 different values (using uniform or non-uniform quantization steps as described above). Each of those 16 different values is then assigned a memory index value in the range of 0 to 15, which forms the memory location index 1735B. The index calculator 1715A for the compensator input signal and the index calculators 1715C-D for higher-order derivatives are implemented analogously, but they do not necessarily need to be quantized to the same number of values as each other. Also, the quantization of the derivative signals 1625, 1635, and 1645 may be different as a function of the compensator input signal 1605 since the rang of values for the derivative signals 1625, 1635, and 1645 varies with the value of the compensator input signal 1605.

Figure 17B:
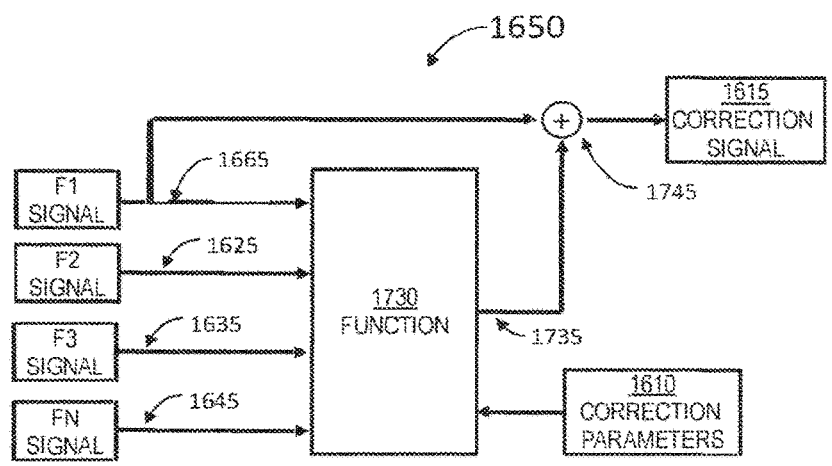
FIG. 17B illustrates a function-based correction calculator.

FIG. 17B illustrates an alternative implementation of the correction calculator 1650 that is based on the evaluation of a corrective function 1730 (instead of addressing a memory 1720). The corrective function 1730 is the implementation and evaluation of mathematical formula that takes as input the compensator input signal 1605 and the derivative signals 1625, 1635, and 1645 and calculates the correction value 1735. The corrective function 1730 can be, for example, a polynomial equation, a spline, a finite-impulse response (FIR) filter, a Volterra nonlinear filter, a nonlinear memory polynomial, or a combination of these. Different functions can be applied to different values of, for example, the compensator input signal 1605 or derivative signals 1625, 1635, or 1645. In one embodiment of the invention, a separate polynomial function is used for each quantized version of the first derivative signal 1625. The correction value 1735 is summed using an adder 1745 with the compensator input signal 1605 to form the correction signal 1615.

Figure 18A:
FIGS. 18A, 18B, and 18C illustrate methods for calculating the derivative of a signal.
Figure 18B:
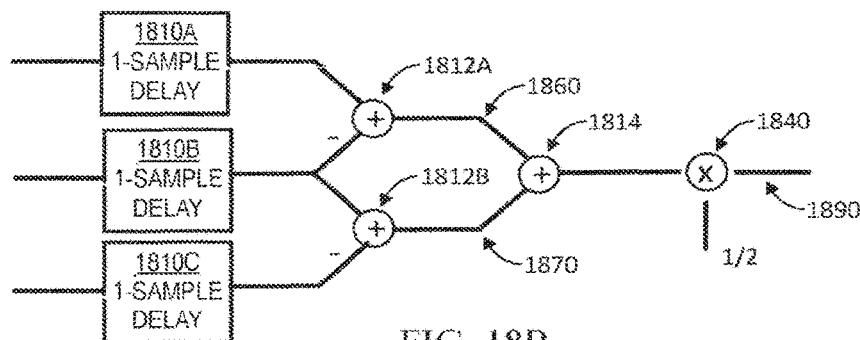
Figure 18C:
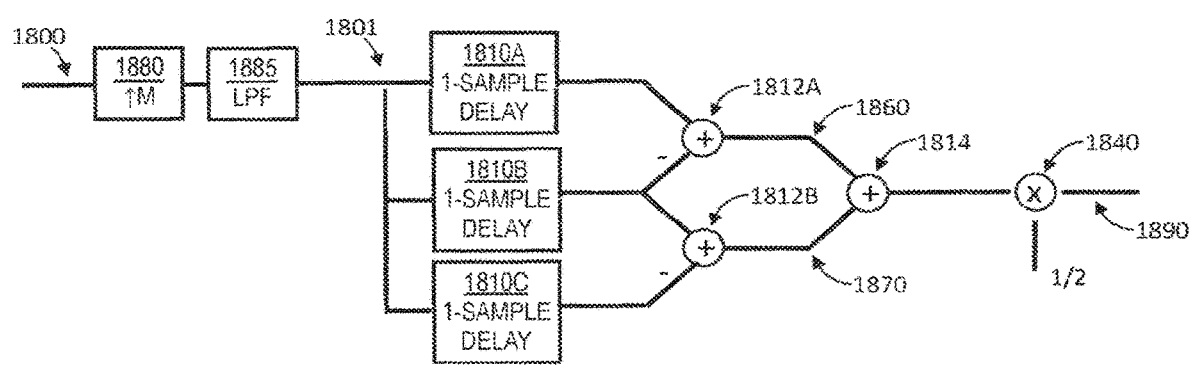

FIGS. 18A-C illustrate three different methods of implementing the first differentiator 1620. Referring to FIG. 18A, the derivative d[n] 1890 of the input signal x[n] 1800 can be obtained by filtering:

$$d[n]=h[n]*x[n]$$

where h[n] 1805 is a FIR filter that operates under the principal that the time domain derivative of a signal x[n] 1800 corresponds to $j\omega X(e^{j\omega})$ in the frequency domain. Therefore, the derivative calculation can be calculated by a digital filter that has the frequency response $j\omega$. Note that special consideration is given to the length of the filter so that the filter delay is an integer so that it can be easily aligned with other data by using simple delay blocks.

Still referring to FIG. 18A, higher-order derivatives can be calculated by the series combination of multiple first-order differentiators 1620. For example, to implement a second-order differentiator 1630 in FIG. 16, two first-order differentiators 1620 can be combined in series, where the output of the second first-order differentiator corresponds to the second derivative signal 1635. This process can be repeated to implement higher-order differentiators.

Referring to FIG. 18B, a lower complexity alternative to calculating the derivative of an input signal 1800 uses first differences. A forward first difference 1860 and a backward first difference 1870 are averaged to estimate the first derivative 1890. The forward first difference 1860 is formed by subtracting 1812A the output of a 2-sample delay 1810B from the output of a 1-sample delay 1810A. The backward first difference 1870 is formed by subtracting 1812B the output of a 3-sample delay 1810C from the output of a 2-sample delay 1810B. The forward first difference 1860 and the backward first difference 1870 are averaged by adding 1814 them together and multiplying 1840 by one-half to form an estimate of the first derivative signal 1890. This method for implementing the derivative is computationally efficient (i.e., smaller size, weight, power, and cost) since it does not use any filtering or multipliers, but the result is generally not as accurate as using the filtering approach of FIG. 18A.

Referring to FIG. 18C, interpolation can be used to improve the accuracy of the first difference method of estimating the derivative shown in FIG. 18B. The input signal 1800 is first upsampled by a factor of M using the upsampler 1880. The output of the upsampler 1880 is then low-pass filtered 1885 to form the interpolated input signal 1801. In general, the low pass filter 1885 has cutoff at π/M. The interpolated input signal is then processed with the sample first difference technique show in FIG. 18B. The definition of the derivative is the instantaneous rate of change of signal, so this technique converges to an accurate estimate of the derivative as the interpolation factor M gets larger. In practice, a value of M=4 is usually sufficient to provide accurate estimation of the derivative.

Figure 21:
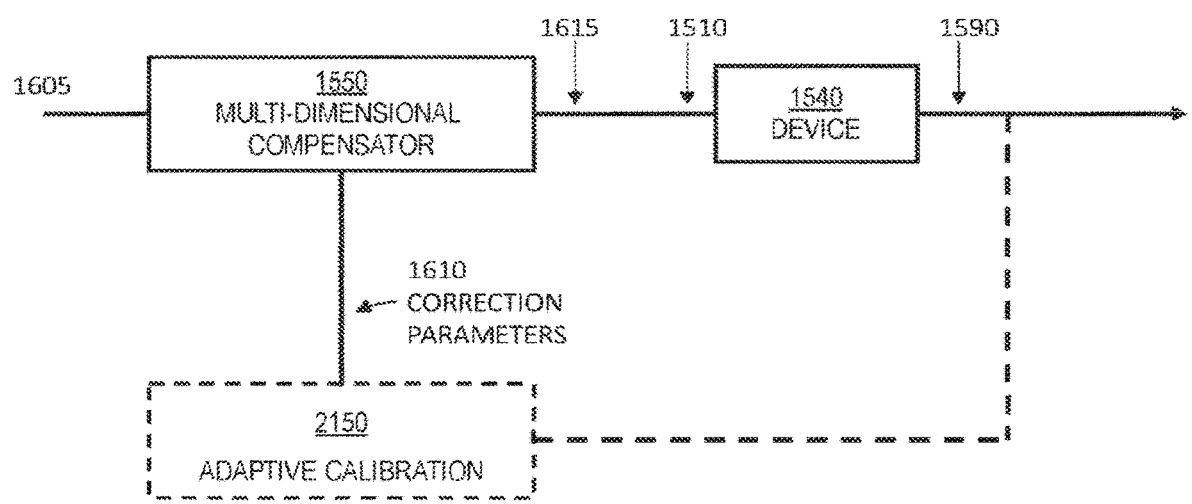
FIG. 21 illustrates a multi-dimensional compensator in a pre-compensation configuration.

As mentioned previously in reference to FIG. 15, for devices 1540 that include conversion from digital signal to analog signals, the multi-dimensional compensator 1540 would be implemented before the device 1540 (referred to as "pre-compensation"). FIG. 21 illustrates a pre-compensation configuration. In this case, the system input signal 1510 feeds the input 1605 to the multi-dimensional compensator 1550 to form the correction signal 1615. The correction signal 1615 is fed to the input of the device 1540 such that the distortion in the output signal 1590 has been canceled. In a preferred embodiment of the invention, the multi-dimensional compensator 1550 can be calibrated in the background using adaptive calibration 2150. The adaptive calibration 2150 takes as input the system output signal 1590 and the system input signal 1510 and provides as output a set of updated correction parameters 1610. The adaptive calibration 2150 is described more fully below in reference to FIG. 23.

Figure 22:
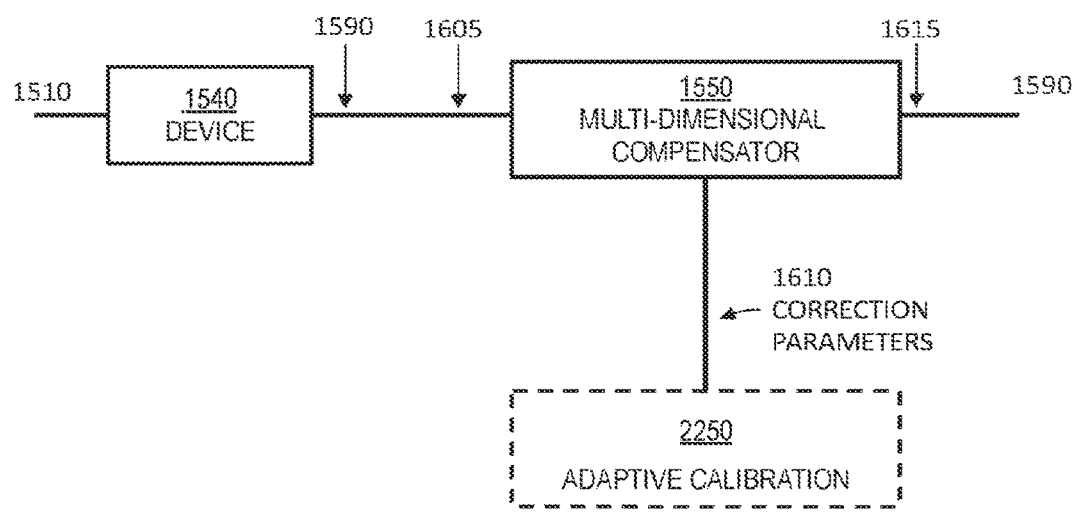
FIG. 22 illustrates a multi-dimensional compensator in a post-compensation configuration.

As also as mentioned previously in reference to FIG. 15, for devices 1540 that include conversion from analog signals to digital signals, the multi-dimensional compensator 1540 would be implemented after the device 1540 (referred to as "post-compensation"). FIG. 22 illustrates a post-compensation configuration. In this case, the system input signal 1510 feeds the input to the device 1540 and the output of the device 1540 feeds the input 1605 to the multi-dimensional compensator 1550. The multi-dimensional compensator 1550 outputs the correction signal 1615 such that the distortion in the output signal 1590 has been canceled. In an embodiment of the invention, the multi-dimensional compensator 1550 can be calibrated in the background using adaptive calibration 2250. Adaptive calibration 2250 provides as output a set of updated correction parameters 1610. Adaptive calibration 2250 for the post-compensation configuration is described more fully below.

In another embodiment of the invention, the correction parameters 1610 in FIG. 22 for the post-compensation system are calculated with a non-adaptive calibration. For example, a one-time factory calibration can be used to calculate and store the correction parameters 1610. The factory calibration may include different calibration conditions, for example, over temperature, tune frequency, power level, or other factors, the identification of which are apparent to one of ordinary skill in the art, that may change over time, where different correction parameters 1610 are calculated, stored, and loaded into the multi-dimensional compensator 1550 as needed. In another embodiment of the invention, the correction parameters 1610 can be calculated periodically with in-system calibration where the normal operation of the device 1540 is temporarily interrupted to inject one or more known calibration signals into the device 1540 to calculate updated correction parameters 1610.

Figure 28:
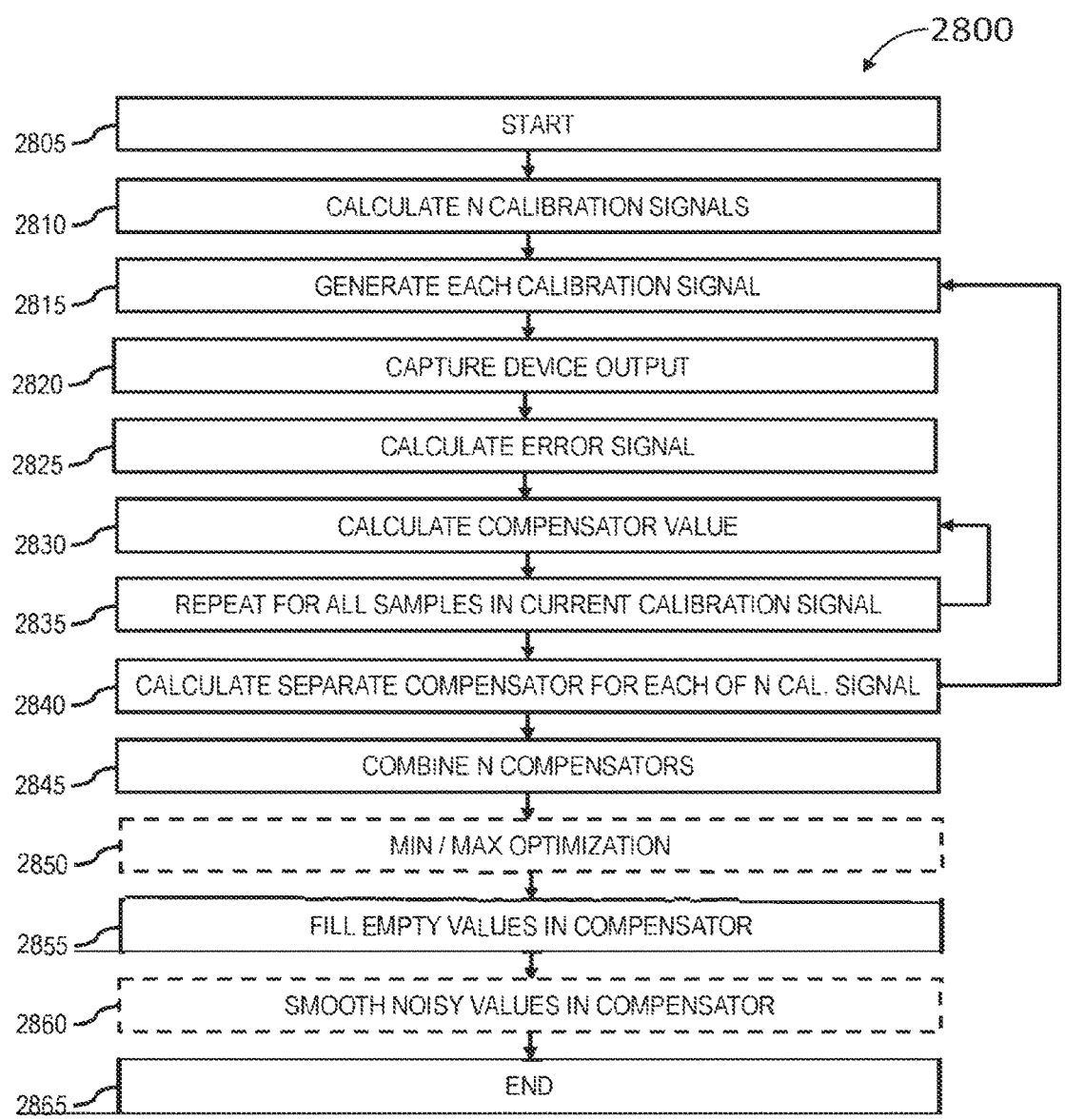
FIG. 28 illustrates a method for non-adaptive calibration of a post-compensated system.

FIG. 28 depicts a flow chart for a method for non-adaptive calibration of the correction parameters 1610 in FIG. 22 for the post-compensation system. At the start 2805 of the calibration process, a set of N calibration signals are calculated 2810. The number N is greater than or equal to one calibration signal. The calibration signal(s) may include one or more single or multi-tone signals spread across the band of interest with varying center frequency, varying spread between the tones, and varying amplitude. The calibration signal(s) may include one or more pseudo-random noise signals. The calibration signal(s) may also include modulated communications or RADAR waveforms for specific applications.

Still referring to FIG. 28, the next step 2815 is to generate each calibration signal. A synthesized signal generator can be used to generate a single-tone signal, or several synthesized signal generators can, by RF combined to generate multi-tone signals. Synthesized signal generators often have undesired harmonic distortion, which can be filtered out with RF low pass filters. Pseudo-random noise signals, modulated signals, or RADAR waveforms can be generated with arbitrary waveform generators (AWGs). Referring to FIG. 22, each calibration signal is applied to the input 1510 of the device 1540.

Referring to both FIG. 22 and FIG. 28, the next step 2820 in the calibration is to capture the output signal 1590 from the device 1540. A buffer of digitized samples of the output signal 1590 is stored in memory. A buffer depth of 8,192 samples is typically sufficient for an accurate calibration.

The next step 2825 is to calculate the error signal. The error signal corresponds to the subtraction of input 1510 of the device 1540 from the output 1590. In many applications, the actual samples of the input signal 1510 are not know but can be estimated from the output signal 1590. One method for estimating the input signal 1510 from the output signal 1590 is to calculate the Fast Fourier Transform (FFT) of the output signal 1590, set all the values of the FFT to be zero for the frequencies not corresponding to the multi-tone input signals, and then perform the inverse FFT to form an estimate of the input signal 1510. This method retains the desired multi-tone signals and removes noise and distortion introduced by the device 1540.

In an alternate embodiment of step 2825, the sub-step of estimating the input signal 1510 from the output signal 1590 includes an extra sub-step of estimating the distortion signal that overlaps the fundamental tones. For device 1540 exhibiting odd-order nonlinear distortion, a portion of the distortion directly overlaps the fundamental desired tones, altering their amplitude and phase. Since this distortion directly overlaps the fundamental signals, this overlapping distortion signal can be difficult to accurately estimate. In one embodiment of the invention, the distortion transfer function is modeled with a third-order nonlinear function $y[n]=a(x[n])^3$ where $y[n]$ distortion signal in output of the device 1540 and $x[n]$ is the input of the device 1540. The unknown value of the variable "a" can be estimated by measuring the levels of the third-order intermodulation distortion components (IMD3). Since the IMD3 components occur at frequencies near (but not overlapping) the fundamental signals, this estimate of "a" is accurate for estimating the overlapping distortion signal. Given the current input $x[n]$ and the estimate of "a", the estimated distortion signal $y[n]$ can be computed. The overlapping distortion signal can be extracted from $y[n]$ by calculating the FFT of $y[n]$, setting all the values of the FFT to be zero for the frequencies not corresponding to the multi-tone input signals, and then performing the inverse FFT to form an estimate of the overlapping distortion signal. This overlapping distortion signal is then added to the previously-estimated input signal 1510 (whose calculation was detailed in the previous paragraph) to form a new, more accurate estimated input signal 1510. The more accurate estimated input signal 1510 is used to calculate a more accurate error signal which is necessary for calculating the compensator value in the next step 2830.

Referring to FIG. 28, the next step 2830 is to calculate the current compensator value. Referring to FIG. 17A, for embodiments of the invention using a memory-based compensator 1650, the current compensator value corresponds to the specific location in the memory 1720 defined by memory indices 1735A-D. The calculation of the memory indices 1735A-D was described previously in reference to FIG. 17A above. The current compensator value corresponding to the current location in memory 1720 is the corresponding error signal value calculated in step 2825.

Referring to both FIG. 22 and FIG. 28, the next step 2835 is to repeat step 2830 for all samples in the current buffer of the output signal 1590. Referring to FIG. 17A, it is possible during this step 2835 that the specific location in memory 1720 defined by memory indices 1735A-D is addressed more than once with differing values of the current compensator value. In that case, in a preferred embodiment of the invention, each of these compensator values is temporarily stored so that they are averaged after all the samples in the current buffer have been processed (i.e., at the completion of step 2835 in FIG. 28). This average value is then stored in the specific location in memory 1720. In an alternative embodiment of the invention, the maximum of each of these compensator values is stored in the specific location in memory 1720.

Referring to both FIG. 28 and FIG. 17A, the next step 2840 is to repeat steps 2815 through 2835 for each of the N calibration signals. Each calibration signal is allocated its own memory 1720 in FIG. 17A, each calibrated in accordance to the steps above. The next step 2845 in FIG. 28 is to combine these N memories 1720 into a single memory 1720 corresponding to the calibrated correction calculator 1650. The N memories can be combined by populating the single memory with the unique entries of the N memories. For any non-unique entries (i.e., "overlapping" entries in the memories 1720), the values in the overlapping memory locations can be averaged. In an alternative embodiment, the maximum of the overlapping memory locations can be used.

Referring to FIG. 28, the next optional step 2850 performs a MINIMAX optimization to minimize the maximum errors, which is described in detail in reference to FIG. 29 below.

Referring to both FIG. 28 and FIG. 17A, the next step 2855 is to fill any remaining empty values in the memory 1720. It is unlikely that all possible memory indices 1735A-D will be exercised, which means that one or more of the entries in the memory 1720 in the correction calculator 1650 shown in FIG. 17A is not been assigned a correction value. Step 2855 in the calibration can used to interpolate the entries in the memory 1720 that have not been assigned a correction value. Many methods for interpolation (also called inpainting) can be used, including nearest neighbor, linear interpolation, polynomial fitting, and piecewise cubic spline, the implementation of which is apparent to one of ordinary skill in the art.

Still referring to both FIG. 28 and FIG. 17A, in one embodiment of the invention, the number of empty values in the memory 1720 can be significantly reduced by a phase rotation method, which can be used an optional additional procedure at the beginning of step 2855 to fill in the empty values. For a multi-tone calibration signal, the distortion transfer function of the device 1540 is usually a function of the amplitude and frequency of the tones but not a function of the phase. However, changing the phase of the tones in the multi-tone calibration signal during the calibration procedure 2800 will exercise different entries in the memory 1720. Since the compensator values in the memory 1720 have already been calculated in step 2830 for each of the multi-tone calibration signals, those values can be used with phase rotations to fill in previously-empty locations in the memory 1720. For each multi-tone calibration signal, the phase of each of the tones can be systematically changed a multitude of times. In one embodiment, the phase is changed randomly with a uniform statistical distribution. In an alternative embodiment, the phase is changed systematically in approximately uniform steps covering all permutations of the phase. The calibration signal is then mathematically generated with the specified phase shifts and using the previously calculated compensator values in the memory 1720 corresponding to the current multi-tone calibration signal calculated in step 2830, that compensator value is repeated in the new memory location exercised by the calibration signal with the phase rotations.

Still referring to both FIG. 28 and FIG. 17A, an optional step 2860 can be performed to smooth noisy values in the memory 1720. It is likely that some of the possible memory indices 1735A-D will be exercised rarely. The more often the entries in the memory 1720 in the correction calculator 1650 shown in FIG. 17A are exercised, the more accurate the correction values 1725 will be because of an averaging effect. A smoothing filter can be applied to the memory 1720 to reduce the noise in the correction values 1725 caused by this effect. For example, a multi-dimensional Gaussian low-pass filter can be convolved with the entries of the memory 1720, the implementation of which is apparent to one of ordinary skill in the art.

Referring to FIG. 28, in one embodiment of the invention, the calibration 2800 can be repeated on a serial combination of two or more multi-dimensional compensators to achieve greater performance. The first multi-dimensional compensator in the serial combination is first calibrated using the calibration 2800 to form the first calibrated multi-dimensional compensator. Then the second multi-dimensional compensator in the serial combination is then calibrated using the calibration 2800. This process can be repeated a multitude of times, improving the performance of the compensation after each stage until the desired performance is achieved.

Figure 29:
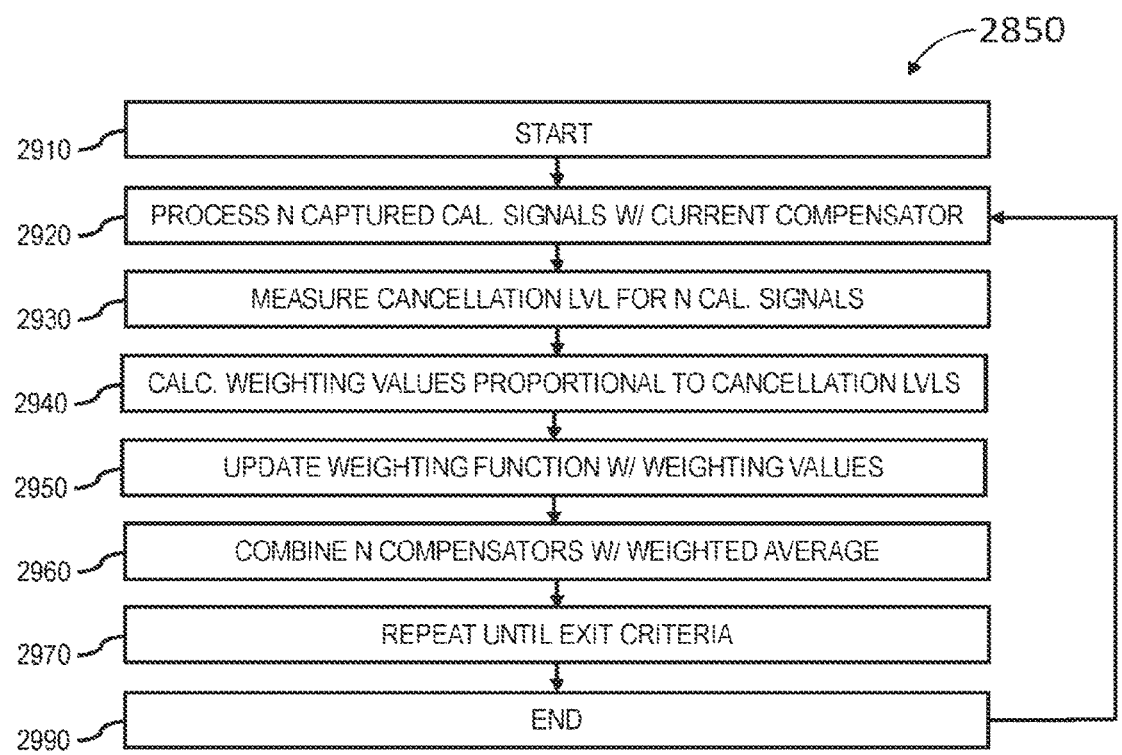
FIG. 29 illustrates a method for MINIMAX optimization of a multi-dimensional compensator.

FIG. 29 depicts a flow chart for the optional step 2850 in the non-adaptive calibration of a post-compensation system 2800 for performing a MINIMAX optimization to minimize the maximum errors. Referring to FIG. 28, the step 2845 generates a single memory 1720 corresponding to the calibrated correction calculator 1650 shown in FIG. 17B. Referring to FIG. 29, the first step 2920 in the MINIMAX optimization 2850 is to process the N signals captured in step 2820 in FIG. 28 using the calibrated correction calculator 1650. The next step 2930 measures the cancellation level for each of these N signals. In a preferred embodiment, the cancellation level corresponds to the largest distortion component in the FFT of each of these N signals. The next step 2940 calculates weighting values that are proportional to the cancellation levels measured in step 2930. In one embodiment, the weighting value is the magnitude of the FFT cell corresponding to the largest distortion component as identified in step 2930. For consistency from one iteration of the algorithm to the next, the set of N weighting values can be divided by the maximum of the N weighting values to normalize the weighting values to a maximum value of one. The next step 2950 updates a weighting function by multiplying the normalized weighting values by the corresponding previous values of the weighting function. On the first iteration, all the values of the weighting function are equal to 1/N, corresponding to equal weighting of all N of the individual memories 1720. On subsequent iterations, once the previous weighting function has been updated by multiplication by the normalized weighting values, the weighting function is normalized such that the sum of the weighting function values equals one. Step 2950 combines the N compensators via a weighted average similar to step 2845 in FIG. 28 as described above. For any non-unique entries (i.e., overlapping entries in the memories 1720), the values in the overlapping memory locations are combined via a weighted average; the memory location for each of the N memories 1720 is multiplied by its corresponding normalized weighting function value and the corresponding values are summed together for all N memories to form the calibrated single memory 1720. The next step 2970 involves repeating steps 2920-2960 until a specific exit criterion is reached. In one embodiment, the exit criterion is a preset number of iterations. In a typical system, the number of iterations equal to 50 is usually sufficient to provide good performance. In an alternate embodiment, the exit criterion is a preset level of the largest measured distortion component; the process 2850 is finished 2990 when the largest distortion component is below this preset level. In another embodiment, the process 2850 is finished 2990 when the N values of the cancellation levels calculated in step 2930 are approximately equal (which is an indication that the MINIMAX optimization is complete).

Figure 30:
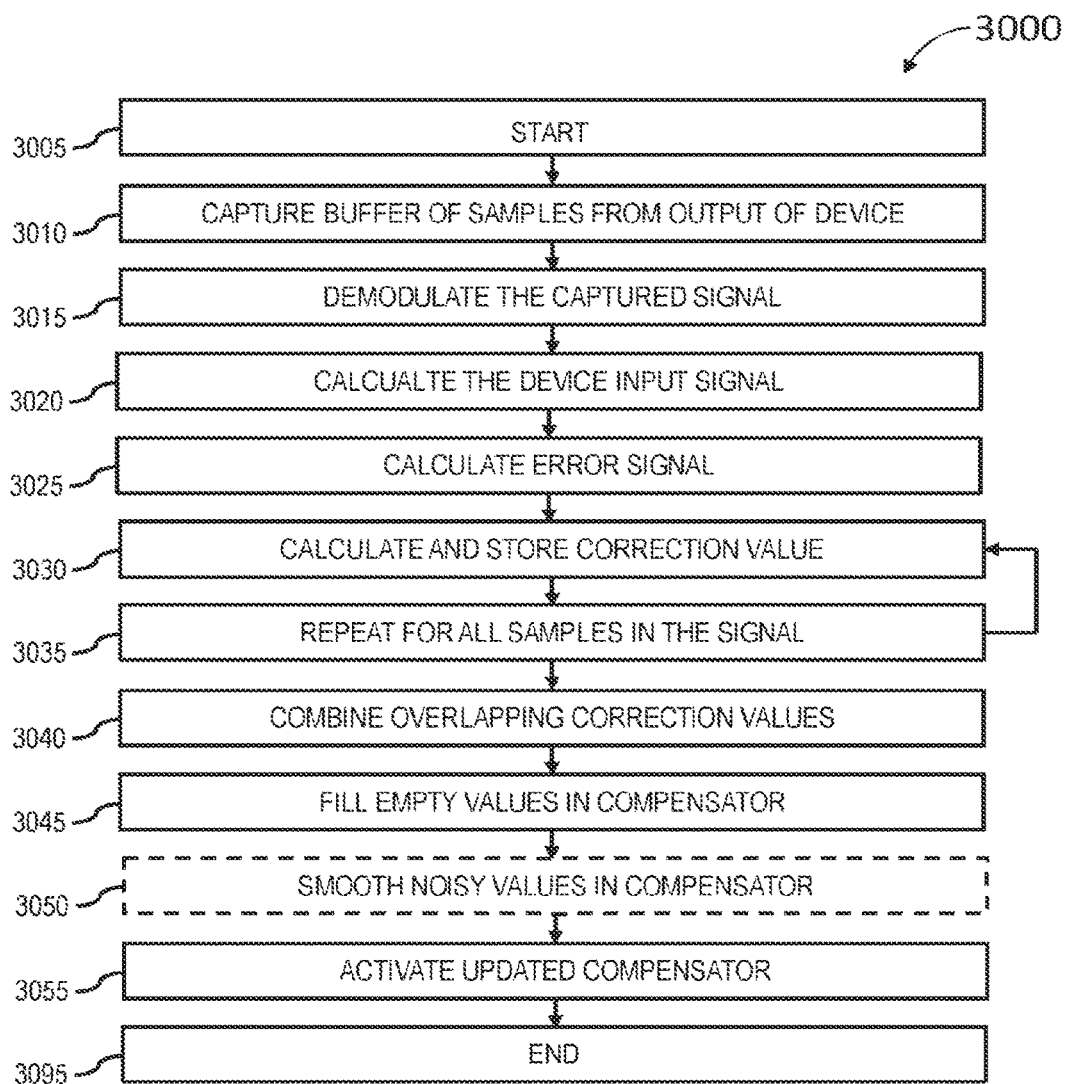
FIG. 30 illustrates a method for adaptive calibration of a post-compensated system.

FIG. 30 depicts a flow chart for a method for adaptive calibration of the correction parameters 1610 in FIG. 22 for the post-compensation system. At the start 3005 of the calibration process, the first step 3010 in the calibration is to capture the output signal 1590 from the device 1540. A buffer of digitized samples of the output signal 1590 is stored in memory. A buffer depth of 8,192 samples is typically sufficient for an accurate calibration.

Referring to FIG. 30, the next step 3015 is to demodulate the signal captured in step 3010. Demodulation requires knowledge of the waveform currently being used in the system, and the appropriate demodulation processing can be applied. For example, if the waveform is 1024-QAM (quadrature amplitude modulation), then a 1024-QAM demodulator can be used to process the signal. Without some knowledge of the type(s) of signals being processed by the system, it may not be possible to deduce the desired input 1510 of the device 1590.

Still referring to both FIG. 22 and FIG. 30, once the signal has been demodulated in step 3015, the demodulated signal is used in step 3020 to calculate the desired input 1510 of the device 1590. The demodulated signal is then modulated using the same modulation scheme, and the modulated signal corresponds to the desired input. This demodulation/modulation step removes noise and distortion caused by the device 1590.

Still referring to both FIG. 22 and FIG. 30, the next step 3025 is to calculate the error signal. The error signal corresponds to the subtraction of input 1510 of the device 1540 from the output 1590.

Referring to FIG. 30, the next step 3030 is to calculate the current compensator value. Referring to FIG. 17A, for embodiments of the invention using a memory-based compensator 1650, the current compensator value corresponds to the specific location in the memory 1720 defined by memory indices 1735A-D. The calculation of the memory indices 1735A-D was described previously in reference to FIG. 17A above. The current compensator value corresponding to the current location in memory 1720 is the corresponding error signal value calculated in step 2825.

Referring to both FIG. 22 and FIG. 30, the next step 3035 is to repeat step 3030 for all samples in the current buffer of the output signal 1590. Referring to FIG. 17A, it is possible during this step 3035 that the specific location in memory 1720 defined by memory indices 1735A-D is addressed more than once with differing values of the current compensator value. Referring to FIG. 30, the next step 3040 is to combine the multiple values. In a preferred embodiment of the invention, each of these compensator values is temporarily stored so that they are averaged after all the samples in the current buffer have been processed (i.e., at the completion of step 3035 in FIG. 30). This average value is then stored in the specific location in memory 1720. In an alternative embodiment of the invention, the maximum of each of these compensator values is stored in the specific location in memory 1720.

Referring to both FIG. 30 and FIG. 17A, the next step 3045 is to fill any remaining empty values in the memory 1720. It is unlikely that all possible memory indices 1735A-D will be exercised, which means that one or more of the entries in the memory 1720 in the correction calculator 1650 shown in FIG. 17A is not been assigned a correction value. Step 3045 in the calibration can used to interpolate the entries in the memory 1720 that have not been assigned a correction value. Many methods for interpolation (also called inpainting) can be used, including nearest neighbor, linear interpolation, polynomial fitting, and piecewise cubic spline, the implementation of which is apparent to one of ordinary skill in the art.

Still referring to both FIG. 30 and FIG. 17A, an optional step 3050 can be performed to smooth noisy values in the memory 1720. It is likely that some of the possible memory indices 1735A-D will be exercised rarely. The more often the entries in the memory 1720 in the correction calculator 1650 shown in FIG. 17A are exercised, the more accurate the correction values 1725 will be because of an averaging effect. A smoothing filter can be applied to the memory 1720 to reduce the noise in the correction values 1725 caused by this effect. For example, a multi-dimensional Gaussian low-pass filter can be convolved with the entries of the memory 1720 (the implementation of which is apparent to one of ordinary skill in the art).

Still referring to both FIG. 30 and FIG. 17A, the final step 3055 activates the updated compensator. The updated memory 1720 can be implemented in a separate memory space from the currently active memory 1720 so that updates do not interfere with the currently active memory 1720. Once the updates have been completed in this adaptive calibration process 3000, the updated memory 1720 can be quickly swapped into the system for a seamless update.

Figure 23:
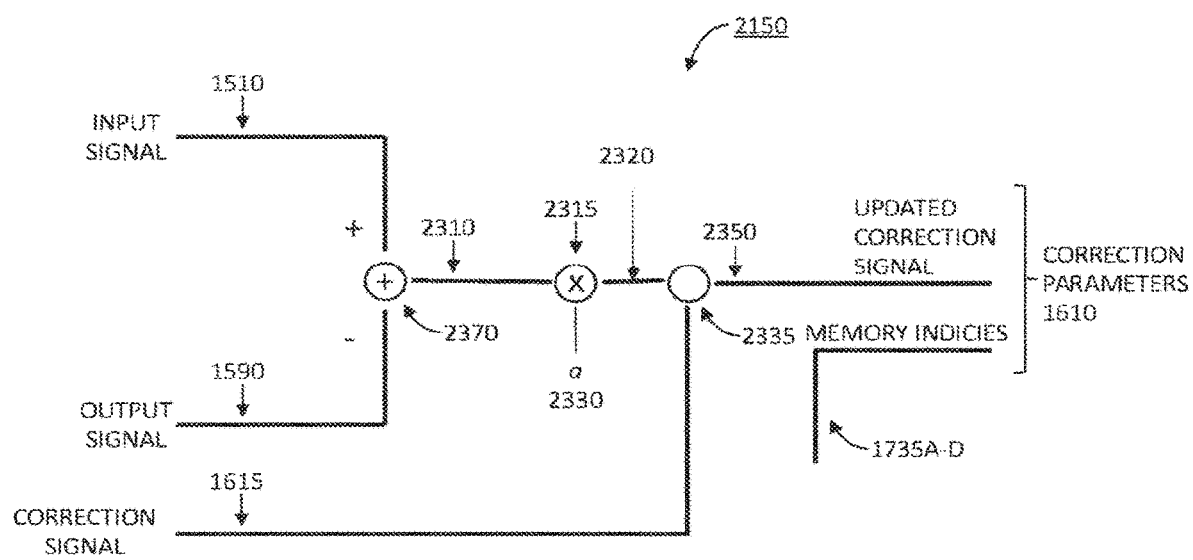
FIG. 23 illustrates adaptive calibration of a multi-dimensional compensator.

FIG. 23 illustrates a preferred embodiment of adaptive calibration 2150 for the pre-compensation configuration shown in FIG. 21. This embodiment allows updates to be calculated in real-time on each clock cycle to track changes that occur very quickly, such as those in fast frequency-hopping systems. Still referring to FIG. 23, an error signal 2310 is formed by subtracting 2370 the system output signal 1510 from the system input signal 1590. The error signal 2310 represents the distortion in the system that is to be cancelled. To insure stability of the algorithm, a convergence factor a 2330 is multiplied 2315 with the error signal 2310 to form the intermediate correction signal 2320. The prior correction signal 1615 and the intermediate correction signal 2320 are combined using the combiner block 2335 to form the updated correction signal 2350. In a preferred embodiment of the invention, the combiner block averages the correction signal 1615 with the intermediate correction signal 2320, which corresponds to a least squares approach. In an alternate embodiment of the invention, the combiner block selects the larger magnitude signal between the prior correction signal 1615 and the intermediate correction signal 2320. This embodiment represents a MINIMAX approach to the distortion cancellation by using the worst case (i.e., largest magnitude) error signals to form the updated correction signal 2350. The adaptive calibration 2150 can be continuously running in the background to track changes in the device 1540, for example, caused by temperature changes, frequency shifts (such as frequency-hopping systems), varying power level, and aging over time.

Referring back to FIG. 17A, the memory indices 1735A-D define which location in memory is currently being accessed to provide the current correction value 1725. Those same memory indices 1735A-D are also used in FIG. 23 to define which memory location is being changed to the updated correction signal 2350. The combination of the memory indices 1735A-D and the updated correction signal 2350 form the correction parameters 1610.

Referring back to FIG. 23, since the correction parameters 1610 depend directly on the error signal 2310, certain parameters of the device 1540 should be measured to provide accurate results and stable performance. These parameters may include the frequency-dependent group delay, D(f), between the device input 1510 and the device output 1590; the frequency-dependent gain, A(f), between the device input 1510 and the device output 1590; or other parameters related to the synchronization of the device.

One method for measuring the frequency-dependent group delay, D(f), is with a calibration signal constructed at baseband using a Kaiser Bessel window function to form the calibration template signal, t[n]. The calibration template signal, t[n], is then mixed to K frequencies, $f_k$, across the desired bandwidth of the system to form the K group delay calibration signals, $g_k[n]$, each of which are sent to the device input 1510 and then captured from the device output 1590 to form the K received signals, $r_k[n]$. The value of K=10 group delay calibration signals is usually sufficient to characterize the frequency variations in the group delay, $D(f_k)$, across the band. Each of the K received signals, $r_k[n]$, is then match filtered against the corresponding K group delay calibration signals, $g_k[n]$, and the time index, n, of the largest correlation corresponds to the measured group delay, $D(f_k)$, for the corresponding frequency, $f_k$. Match filtering and correlation computations are mathematical techniques apparent to one of ordinary skill in the art. In some cases, noise in the system introduces ambiguities in the measured group delay, $d_k$, corresponding to integer shifts of the period of the sample rate of the system. In those cases, the measured group delays, $D(f_k)$, are first normalized by unwrapping these shifts in the measurements to remove the discontinuities corresponding to the ambiguities in the measured group delay, $D(f_k)$. Unwrapping refers to removing integer shifts of the period of the sample rate of the system.

One method for removing the effect of the group delay is to apply a group delay correction filter, $h_{DELAY}[n]$, to the device output 1590. The group delay correction filter, $h_{DELAY}[n]$, can be designed, for example, with standard FIR filter design techniques (such as a damped Gauss-Newton method) apparent to one of ordinary skill in the art. The desired frequency response of the group delay correction filter, $h_{DELAY}[n]$, would be unity gain with group delay equal to the negative of the measured group delay, $D(f_k)$.

The frequency-dependent gain, A(f), can be measured by applying L single-tone signals with frequency $f_L$ across the desired bandwidth of the system. The value of L=20 single-tone signals is usually sufficient to characterize the frequency variations in the gain, $A(f_L)$, across the band. Each single-tone signal, $a_L[n]$, is sent to the device input 1510 and then captured from the device output 1590 to form the L received signals, $s_L[n]$. One method for calculating the magnitude of the gain, $A(f_L)$, at each of the L frequencies, $f_L$, is by dividing the root-mean-square (RMS) value of each of the received signals, $s_L[n]$, by the RMS value of the corresponding input single-tone signals, $a_L[n]$. Other methods of calculating the gain, such as dividing the FFTs of the signals $s_L[n]$ and $a_L[n]$, would be apparent to one of ordinary skill in the art.

One method for removing the effect of the frequency-dependent gain is to apply a gain correction filter, $h_{GAIN}[n]$, to the device output 1590. The gain correction filter, $h_{GAIN}[n]$, can be designed, for example, with standard FIR filter design techniques (such as the Parks-McClellan method) apparent to one of ordinary skill in the art. The magnitude of the desired frequency response gain correction filter, $h_{GAIN}[n]$, would be equal to the multiplicative inverse of the measured group delay, $A(f_L)$ (i.e., $1/A(f_L)$).

Referring back to FIG. 17B (which illustrates an alternative implementation of the correction calculator 1650 that is based on the evaluation of a function 1730 instead of a memory 1720), the correction parameters 1610 are comprised of the function coefficients. For example, if the function 1730 is implemented as a polynomial equation, then the correction parameters 1610 are the coefficients of the polynomial equation.

Still referring to FIG. 17B, the alternative implementation of the correction calculator 1650 that takes the form of a mathematical function 1730 can also be adaptively calibrated. Now referring to FIG. 23, one method of calibrating the correction parameters 1610 for the function 1730 is to perform the same adaptive calibration 2150 that would be performed on the memory 1720 but with one additional step. First, a memory-based implementation of a correction calculator 1650 shown in FIG. 17A would be implemented and calibrated with the method shown in FIG. 23. The additional step would be to fit a function to the correction values in the memory 1720. In one embodiment, a separate polynomial function can be fit to the correction values in the memory 1720 for each unique derivative signal 1625, 1635, and 1645. This represents a one-dimensional vector of values for which a polynomial equation can be optimally fit in a least-mean squares algorithm (the implementation of which is apparent to one of ordinary skill in the art). Other embodiments may use alternate functions such as spline or finite-impulse response filters.

Referring to FIG. 23, during normal operation, it is unlikely that all possible memory indices 1735A-D will be exercised, which means that one or more of the entries in the memory 1720 in the correction calculator 1650 shown in FIG. 17A is not been assigned a correction value. An additional step in the adaptive calibration 2150 can used to interpolate the entries in the memory 1720 that have not been assigned a correction value. Many methods for interpolation (also called inpainting) can be used, including nearest neighbor, linear interpolation, polynomial fitting, and piecewise cubic spline, the implementation of which is apparent to one of ordinary skill in the art.

Referring to FIG. 23, during normal operation, it is likely that some of the possible memory indices 1735A-D will be exercised rarely. The more often the entries in the memory 1720 in the correction calculator 1650 shown in FIG. 17A are exercised, the more accurate the correction values 1725 will be because of an averaging effect of the adaptive calibration 2150 in FIG. 23. A smoothing filter can be applied to the memory 1720 to reduce the noise in the correction values 1725 caused by this effect. For example, a multi-dimensional Gaussian low-pass filter can be convolved with the entries of the memory 1720 (the implementation of which is apparent to one of ordinary skill in the art).

Figure 31:
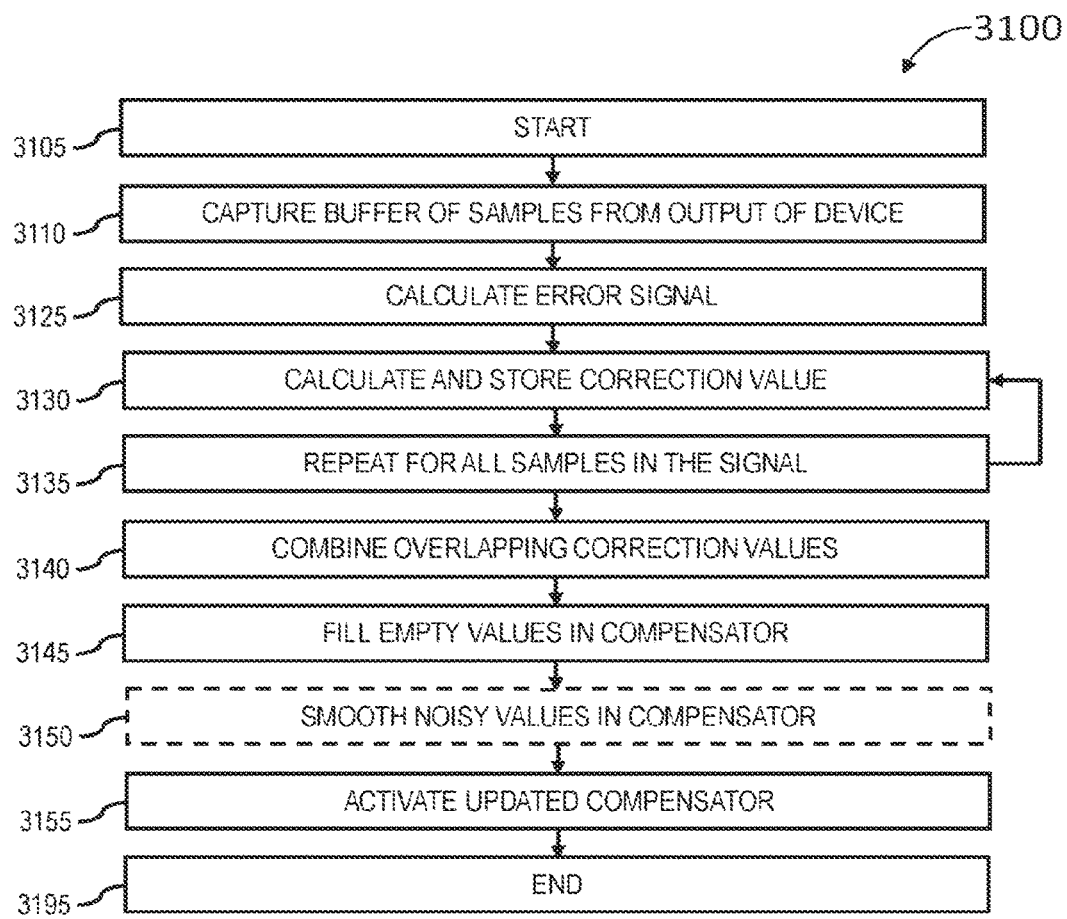
FIG. 31 illustrates a buffer-memory based method for adaptive calibration of a pre-compensated system.

FIG. 31 depicts a flow chart for an alternate method for adaptive calibration of the correction parameters 1610 in FIG. 23 for the pre-compensation system using a buffered memory approach. This allows the updates to be calculated in the background at a slower processing rate and not necessarily be updating the processing at each clock cycle. At the start 3105 of the calibration process, the first step 3110 in the calibration is to capture the output signal 1590 from the device 1540. A buffer of digitized samples of the output signal 1590 is stored in memory. A buffer depth of 8,192 samples is typically sufficient for an accurate calibration.

Referring to both FIG. 22 and FIG. 31, the next step 3125 is to calculate the error signal. The error signal corresponds to the subtraction of input 1510 of the device 1540 from the output 1590.

Referring to FIG. 31, the next step 3130 is to calculate the current compensator value. Referring to FIG. 17A, for embodiments of the invention using a memory-based compensator 1650, the current compensator value corresponds to the specific location in the memory 1720 defined by memory indices 1735A-D. The calculation of the memory indices 1735A-D was described previously in reference to FIG. 17A above. The current compensator value corresponding to the current location in memory 1720 is the corresponding error signal value calculated in step 3125.

Referring to both FIG. 22 and FIG. 31, the next step 3135 is to repeat step 3130 for all samples in the current buffer of the output signal 1590. Referring to FIG. 17A, it is possible during this step 3035 that the specific location in memory 1720 defined by memory indices 1735A-D is addressed more than once with differing values of the current compensator value. Referring to FIG. 31, the next step 3140 is to combine the multiple values. In a preferred embodiment of the invention, each of these compensator values is temporarily stored so that they are averaged after all the samples in the current buffer have been processed (i.e., at the completion of step 3135 in FIG. 31). This average value is then stored in the specific location in memory 1720. In an alternative embodiment of the invention, the maximum of each of these compensator values is stored in the specific location in memory 1720.

Referring to both FIG. 31 and FIG. 17A, the next step 3145 is to fill any remaining empty values in the memory 1720. It is unlikely that all possible memory indices 1735A-D will be exercised, which means that one or more of the entries in the memory 1720 in the correction calculator 1650 shown in FIG. 17A is not been assigned a correction value. Step 3145 in the calibration can used to interpolate the entries in the memory 1720 that have not been assigned a correction value. Many methods for interpolation (also called inpainting) can be used, including nearest neighbor, linear interpolation, polynomial fitting, and piecewise cubic spline, the implementation of which is apparent to one of ordinary skill in the art.

Still referring to both FIG. 31 and FIG. 17A, an optional step 3050 can be performed to smooth noisy values in the memory 1720. It is likely that some of the possible memory indices 1735A-D will be exercised rarely. The more often the entries in the memory 1720 in the correction calculator 1650 shown in FIG. 17A are exercised, the more accurate the correction values 1725 will be because of an averaging effect. A smoothing filter can be applied to the memory 1720 to reduce the noise in the correction values 1725 caused by this effect. For example, a multi-dimensional Gaussian low-pass filter can be convolved with the entries of the memory 1720 (the implementation of which is apparent to one of ordinary skill in the art).

Still referring to both FIG. 31 and FIG. 17A, the final step 3155 activates the updated compensator. The updated memory 1720 can be implemented in a separate memory space from the currently active memory 1720 so that updates do not interfere with the currently active memory 1720. Once the updates have been completed in this adaptive calibration process 3000, the updated memory 1720 can be quickly swapped into the system for a seamless update.

Figure 24:
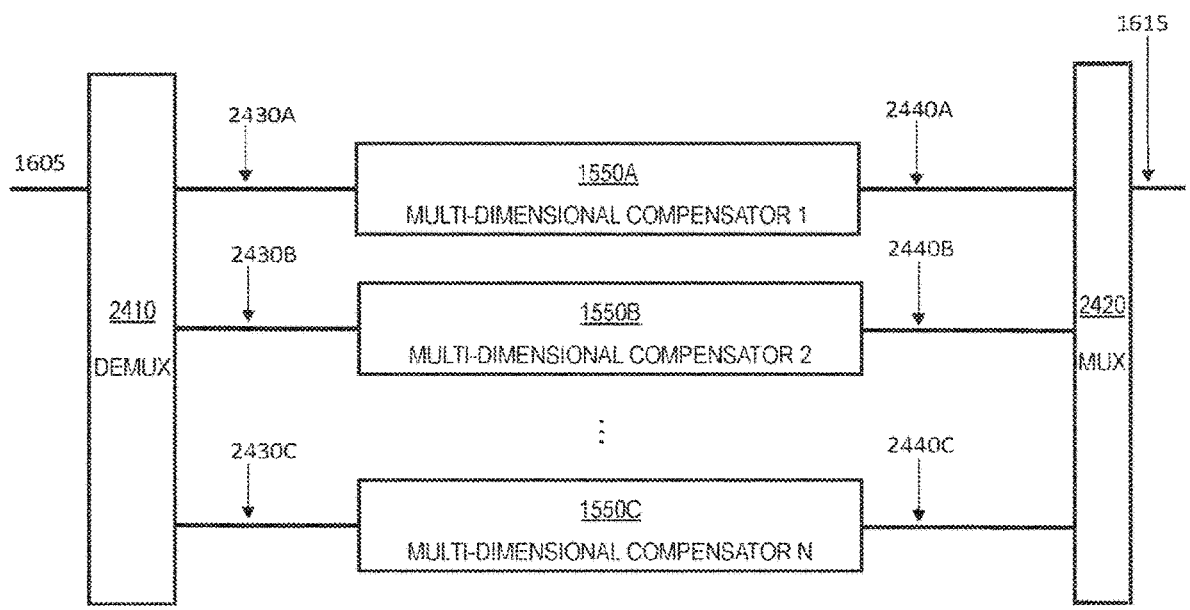
FIG. 24 illustrates a time-division multiplexed multi-dimensional compensator.

FIG. 24 illustrates an embodiment of the invention that uses multiple time-interleaved multi-dimensional compensators 1550A-C. Some devices 1540 are actually multiple time-interleaved sub-devices, each with its own distortion. For example, a wideband analog-to-digital converter can be built using a parallel combination of multiple analog-to-digital converters, each operating on its own time slice. For example, four converters can be used to quadruple the speed of the conversion by clocking the converters 90 degrees out-of-phase. To compensate for the individual distortions that each of these time-interleaved sub-devices exhibit, the compensator input signal 1605 is divided into multiple time-interleaved signals 2430A-C using a demultiplexer 2410. Each time-interleaved signal 2430A-C is allocated its own, corresponding multi-dimensional compensator 1550A-C, whose corresponding outputs 2440A-C are recombined using a multiplexer 2420 to form the correction signal 1615.

Figure 32:
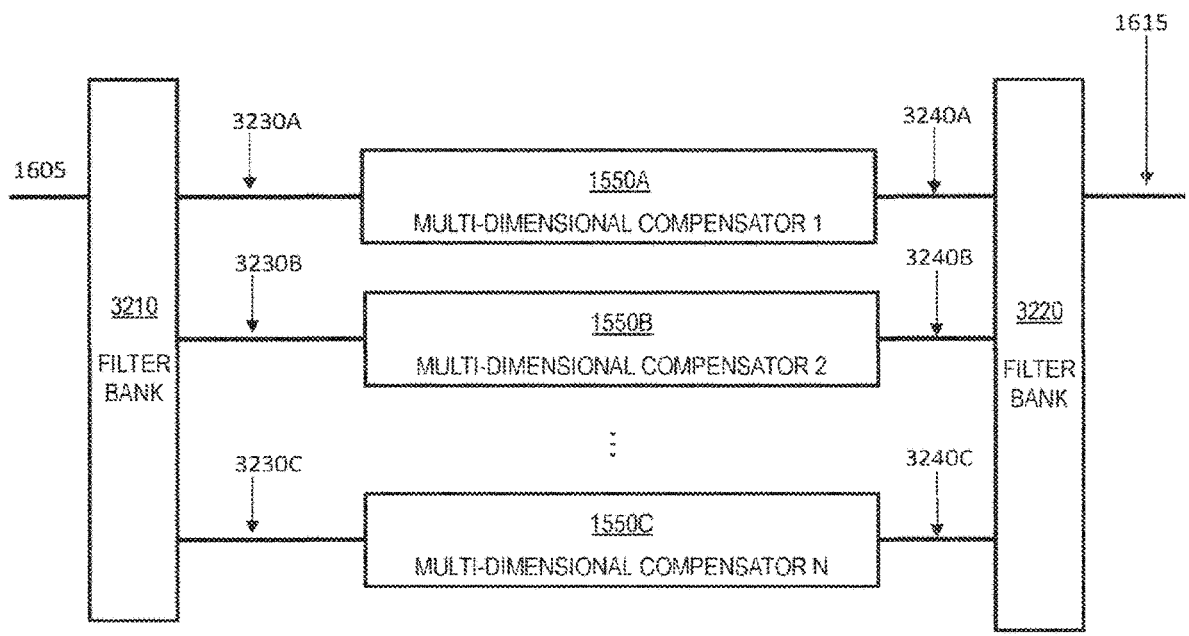
FIG. 32 illustrates a frequency-division multiplexed multi-dimensional compensator.

FIG. 32 illustrates an embodiment of the invention that uses multiple frequency division multiplexed multi-dimensional compensators 1550A-C. Some devices 1540 are implemented with multiple frequency-division multiplexed sub-devices, each with its own distortion. For example, a wideband analog-to-digital converter can be built using a parallel combination of multiple analog-to-digital converters, each operating on its own frequency band. For example, four converters can be used to quadruple the speed of the conversion by allocating one-fourth of the band to each converter. To compensate for the individual distortions that each of these frequency-division multiplexed sub-devices exhibit, the compensator input signal 1605 is divided into multiple frequency-division multiplexed signals 3230A-C using a filter bank 3210. Each frequency-division multiplexed signal 3230A-C is allocated its own, corresponding multi-dimensional compensator 1550A-C, whose corresponding outputs 3240A-C are recombined using a filter bank 3220 to form the correction signal 1615.

Figure 25:
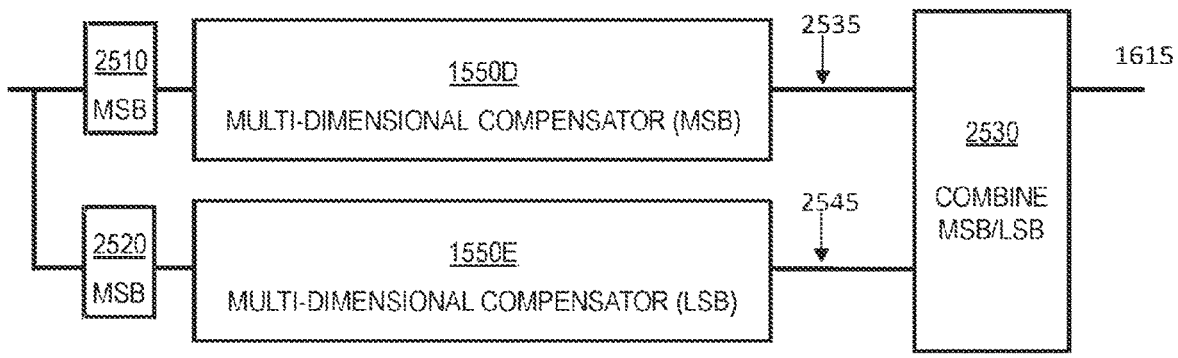
FIG. 25 illustrates a sub-ranged multi-dimensional compensator.

FIG. 25 illustrates an embodiment of the invention that uses multiple multi-dimensional compensators 1550D-E for different amplitude ranges. Some devices 1540 are multiple sub-devices for different amplitude range, each with its own distortion. For example, a high-resolution analog-to-digital converter can be built using multiple sub-ranged analog-to-digital converters, each operating on its own amplitude range. To compensate for the individual distortions that each of these sub-devices exhibit, the compensator input signal 1605 is divided into multiple signals corresponding to different amplitude ranges. The compensator input signal 1605 is divided into its most significant bits with the MSB block 2510 to form the MSB signal 2515 and its least significant bits with the LSB bock 2520 to form the LSB signal 2525. One implementation of the MSB block 2510 is a right bit shifter to truncate the input signal 1605 to its most-significant bits. Similarly, one implementation of the LSB block 2520 is a left bit shifter to truncate the input signal 1605 to its least significant bits. The MSB signal 2515 and the LSB signal 2525 are allocated their own, corresponding multi-dimensional compensator 1550D and 1550E respectively, whose corresponding outputs 2535 and 2545 are recombined using a combiner 2530 to form the correction signal 1615. The combiner 2530 can be implemented by left shifting the MSB compensator signal 2535 and adding it to the LSB compensator signal 2545.

Figure 26:
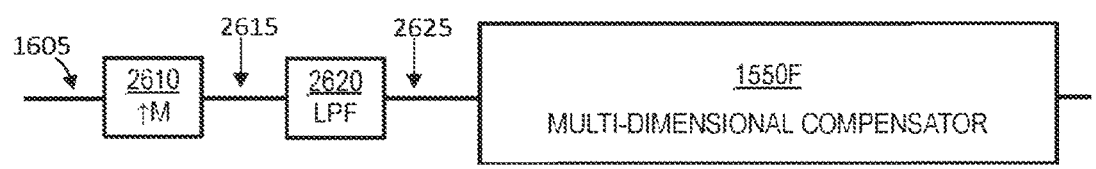
FIG. 26 illustrates an interpolated multi-dimensional compensator.

FIG. 26 illustrates an embodiment of the invention that uses interpolation to increase the resolvable bandwidth of the system. If a device 1540 exhibits $M^{th}$ order nonlinear distortion, the distortion components will span M times the bandwidth (BW) of the original signal. For a critically-sampled system where the sample rate satisfies the Nyquist criterion where the sampling rate Fs is equal to twice the bandwidth (BW), then some of the nonlinear distortion will alias in-band and be indistinguishable from distortion components at a lower frequency. To properly resolve these distortion components, the compensator input signal 1605 can be interpolated by a factor of M to eliminate the possibility of aliasing. Interpolation can be implemented by upsampling 2610 by a factor of M to form the upsampled signal 2615 followed by low-pass filtering 2620 to form the interpolated signal 2625. The interpolated signal 2625 feeds the multi-dimensional compensator 1550F, which is able to properly handle the higher frequency distortion components that would otherwise have been aliased.

Figure 27:
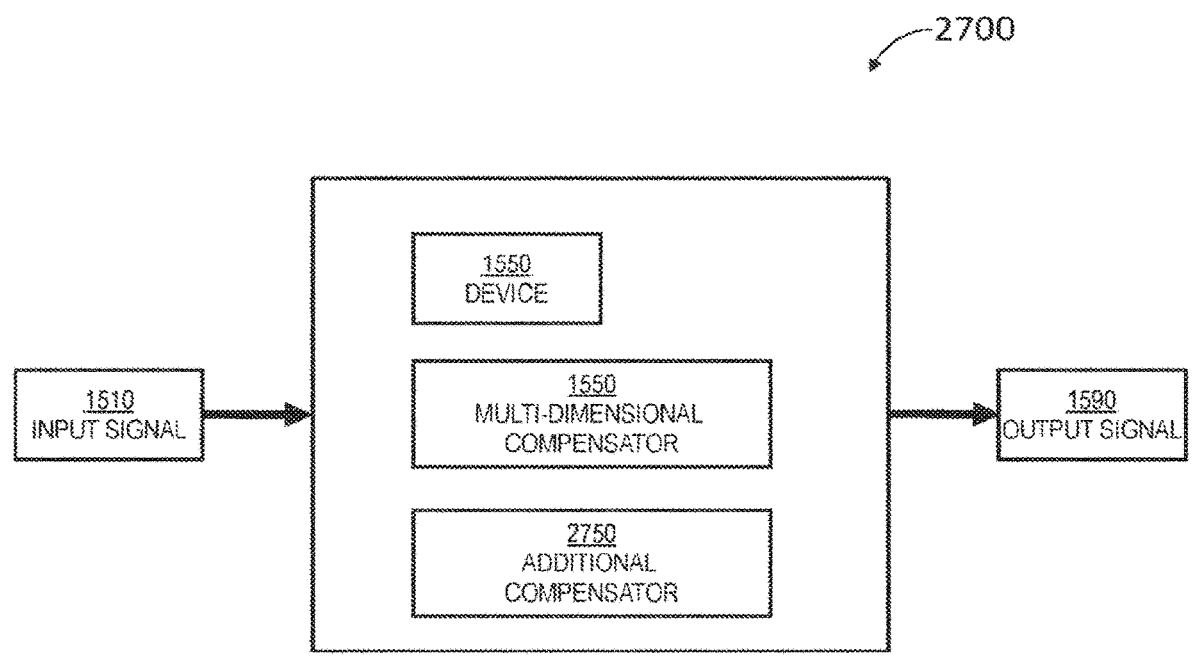
FIG. 27 illustrates a compensated system with a multi-dimensional compensator with an additional compensator.

FIG. 27 illustrates a multi-dimensional compensation system 2700 of a device 1540 exhibiting distortion that includes a multi-dimensional compensator 1550 and an additional compensator 2750. The multi-dimensional compensator 1550 is a computationally-efficient approach to cancelling distortion, but some applications may require even higher levels of performance. In those cases, an additional compensator 2750 can be used to provide the extra performance. In one embodiment of the invention, the additional compensator can be a Volterra nonlinear filter for accurately modeling nonlinear distortion over frequency. A benefit for combining the Volterra filter implementation of the additional compensator 2750 with a multi-dimensional compensator 1550 is that the multi-dimensional compensator 1550 can significantly reduce the complexity, size, weight, power, and cost of the Volterra processing compared to using a Volterra processing approach alone.

Figure 19:
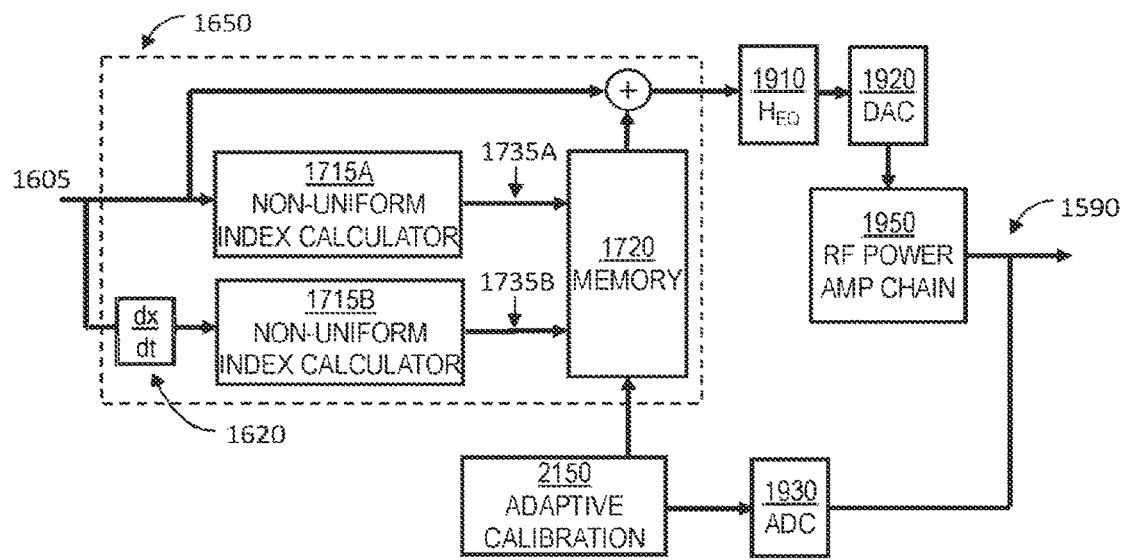
FIG. 19 illustrates a multi-dimensional compensator applied to an RF power amplifier application.

FIG. 19 depicts an embodiment of the multi-dimensional compensator for a pre-distortion compensation of an RF power amplifier. The multi-dimensional compensator 1650 uses two functional inputs, the first of which is present signal input 1605 and the second is the first derivative function 1620. The index calculator 1715A operates on the present signal input 1605 and corresponds to a non-uniform indexing configuration. The input 1605 is quantized to 12-bit resolution corresponding to 4096 different possible states. In the index calculator 1715A, the range of present signal input 1605 levels from −511 to +512 is allocated 1024 uniformly-distributed values. The range of present signal input 1605 levels from −2048 to −512 is allocated 512 uniformly-distributed values. Similarly, the range of present signal input 1605 levels from +2048 to +512 is also allocated 512 uniformly-distributed values. This allocation reduces the size of the memory 1720 by 50% since the 4096 possible states of the present signal input 1605 is allocated a total of 2048 locations in the memory 1720.

Still referring to FIG. 19, the output of the first derivative function 1620 is normalized to have values between −2 and +2 and quantized by the index calculator 1715B into 32 non-uniformly distributed values. The range of values from −0.5 to +0.5 is allocated 24 uniformly-distributed values. The range of values from +2 to +0.5 is allocated 4 uniformly-distributed values. Similarly, the range of values from −2 to −0.5 is also allocated 4 uniformly-distributed values. Statistically, signals are more likely to have first derivative values near zero, so more quantization resolution (i.e., more quantized values) are allocated for small values (i.e., −0.5 to +0.5).

Still referring to FIG. 19, the nominal size of the memory 1720 is equal to 2048 present signal input values times 32 values of the derivative, which equals 65,536 memory locations (i.e., 64K) each with 16 bits of resolution. The nominal data rate of this system is 2560 MHz which exceed the clock speed limitations of current field programmable gate arrays (FPGAs), so the processing is implemented in a parallel fashion by demultiplexing the data by a factor of 8, which corresponds to a data rate of 320 MHz. Therefore, the 64K memory 1720 is implemented in eight 64K demultiplexed memories each operating at 320 MHz.

Still referring to FIG. 19, the first differentiator function 1620 is implemented in an interpolated first difference architecture shown in FIG. 18C where the interpolation rate M in the interpolator 1880 is equal to 4.

Still referring to FIG. 19, the output of the multi-dimensional compensator 1650 optionally feeds a correction filter $H_{EQ}$ 1910 that can be used to adjust the amplitude and/or phase of the signal to compensate for frequency-dependent variations. The filter 1910 is implemented as a 16-tap FIR filter. The output of the filter 1910 feeds a digital-to-analog converter (DAC) 1920 with 12-bit resolution sampling at 2560 MHz clock rate. The DAC 1920 converts digital inputs to analog outputs. The output of the DAC 1920 then feeds the RF power amplifier signal chain 1950, which includes low pass filters (to remove high-frequency images of the signal induced by the DAC, a driver pre-amplifier, a high-power GaN RF power amplifier, and an RF load (such as an attenuator). The output of the RF power amplifier signal chain 1950 is also fed to an analog-to-digital converter (ADC) 1920 with 12-bit resolution sampling at 2560 MHz clock rate. The frequency band of operation for this system is 100 MHz to 1000 MHz. The output of the ADC 1930 feeds the adaptive calibration block 2150.

Still referring FIG. 19, the adaptive calibration block 2150 is implemented in the buffer-based adaptive calibration 3100 shown in FIG. 31 and described previously. The number of samples in the buffer uses in step 3110 is equal to 3,840 samples. In step 3125, the error signal is calculated using the output of the ADC 1930, which corresponds to the RF power amplifier output.

Figure 20:
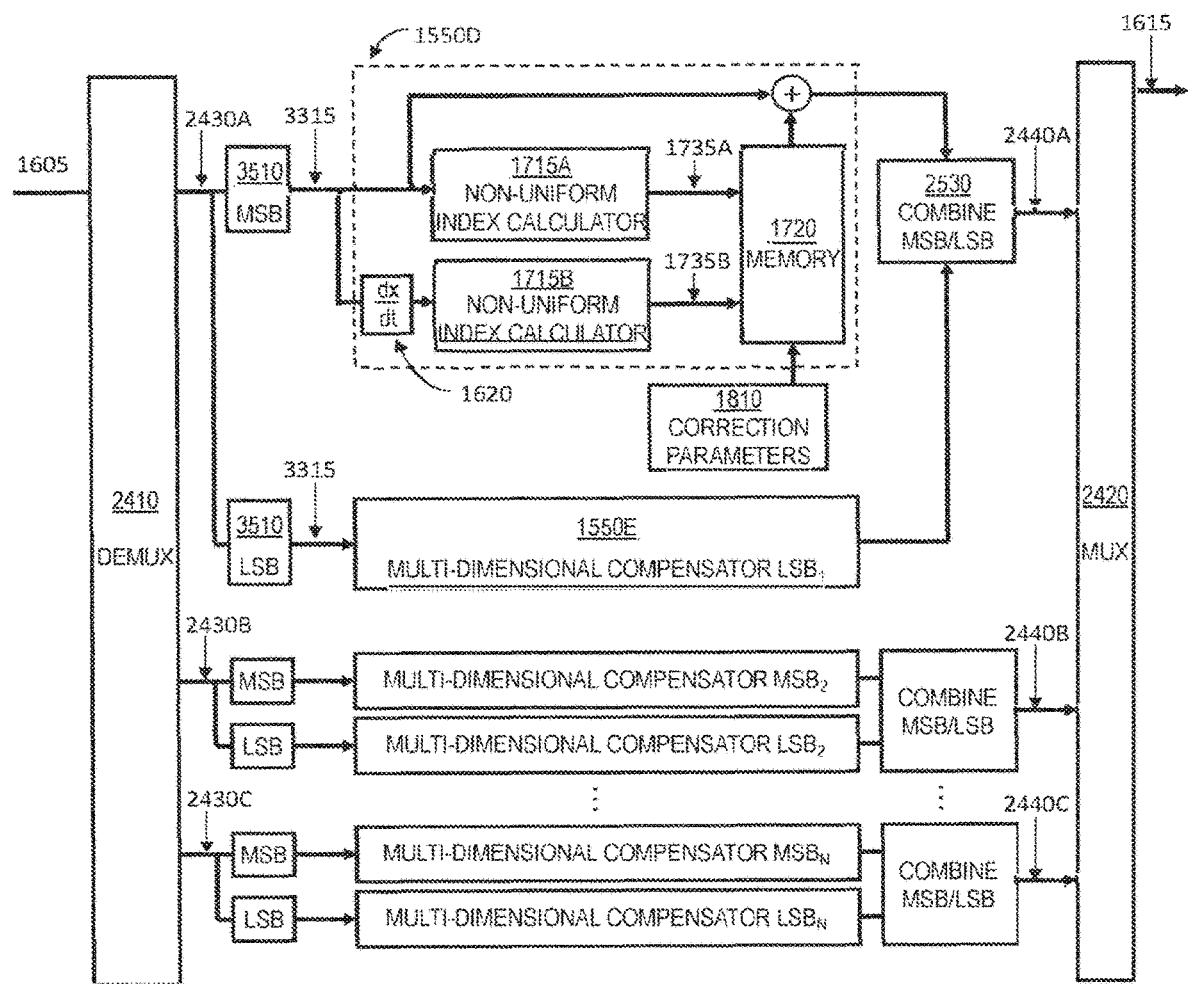
FIG. 20 illustrates a multi-dimensional compensator applied to wideband analog-to-digital and digital-to-analog conversion

FIG. 20 depicts an embodiment of the multi-dimensional compensator for either post-compensation of a time-interleaved analog-to-digital converter (ADC) or pre-compensation of a time-interleaved digital-to-analog converter (DAC) implemented in an application-specific integrated circuit (ASIC). The compensator is implemented as a parallel array of demultiplexed multi-dimensional compensators as described previously in reference to FIG. 24. A time-interleaved ADC or DAC is comprised of a parallel array of M individual converters, where each individual converter is operating on its own time slice at 1/M of the system data rate. Demultiplexing the data by a factor of M allocates a separate multi-dimensional compensator for each individual converter.

Referring back to FIG. 20, the compensator input signal 1605 is processed with the demultiplexer 2410 to form 64 parallel signals 2430A-C (each at $\frac{1}{64}^{th}$ the data rate of the input 1605). The input signal 1605 is quantized to 8-bit resolution and is running at data rates ranging from 32 GHz to 64 GHz. Each output 2440A-C is multiplexed 2420 back together to form the compensator input output signal 1615. For post-compensation of a time-interleaved ADC, the ADC output feeds the compensator input signal 1605, and the compensator output signal 1615 corresponds to the compensated ADC signal. For pre-compensation of a time-interleaved DAC, the compensator input signal 1605 corresponds to the system input, and the compensator output signal 1615 corresponds to the pre-compensated signal which feeds the DAC input such that the output of the DAC is compensated.

Each of the parallel demultiplexed signals 2430A-C is further sub-divided into two sub-ranged multi-dimensional compensators as described previously in reference to FIG. 25. Each time-interleaved ADC is an 8-bit sub-ranged architecture, where a separate internal 4-bit ADC is used to quantize the most-significant bits (MSBs) corresponding to a coarse quantization of the input signal; similarly, a separate internal 4-bit ADC is used to quantize the least-significant bits (LSBs) corresponding to a fine quantization of the input signal. The MSB ADC and the LSB ADC may have different distortion mechanisms, so separate multi-dimensional compensators 1550D and 1550E are allocated to the MSBs and the LSBs respectively. The sub-ranged multi-dimensional compensators 1550D and 1550E output signals 2535 and 2345 respectively, which are combined with the MSB/LSB combiner 2430 as previously described in reference to FIG. 25. This architecture is similarly repeated to form output signals 2440B-C. The signals 2440B-C are multiplexed 2420 back together as described in the previous paragraph.

Referring to FIG. 20, the sub-ranged MSB multi-dimensional compensator includes the present value function for the first input signal 2515 and the first derivative function 1620 for the second input signal. The index calculator 1715A applies a non-uniform quantization on the 16 states of the 4-bit present value signal 2515. The index calculator 1715B applies a non-uniform quantization on the output of the first derivative function 1620, providing 32 quantization states. The resulting size of the memory 1720 is 512 entries, each with 8 bits of resolution. The sub-ranged LSB multi-dimensional compensator 1550E is implemented analogously to compensator 1550D. The correction parameters 1610 are calculated in the calibration routine 2800 as described previously in reference to FIG. 28.

The techniques described above can be implemented via software in certain implementations. For example, the techniques described above are applied to an audio subwoofer signal using software executed on a digital signal processor (DSP chip), software running on a standard processor or graphics processing unit (GPU), field programmable gate array (FPGA), or application specific circuit (ASIC). Audio signals are much, much lower bandwidth than radio frequency signals, and thus it is practical to implement the multi-dimensional compensator in software for audio applications.

The present invention is applicable to a wide range of military and commercial applications including, but not limited to: advanced radar systems; software-defined radios; multi-beam adaptive digital beamforming array transceivers, smart radios for wireless communications (terrestrial and satellite); wideband electronic warfare transceivers; general test equipment such as oscilloscopes, spectrum analyzers, and network analyzers; special test equipment, wide bandwidth modems, anti jam global positioning system (GPS) receivers, and active radar for Earth science measurements.

While the present invention has been described for a predistortion linearization application (such as linearization of RF transmit electronics including RF power amplifiers or digital-to-analog converters), it will be readily apparent to one of ordinary skill in the art that the same principles can be applied to a post-distortion linearization application (such as linearization of RF receive electronics, including low noise amplifiers or analog-to-digital converters) as well as modeling of linear and nonlinear distortion in a signal cancellation architecture.

The term "coupled" as used herein means connected to or in communication with such that one component can convey an analog signal or a digital signal to another component, either directly or indirectly via one or more intermediate components.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A device comprising:
a transmit chain comprising a first digital-to-analog converter (DAC) and a power amplifier, wherein the transmit chain produces an analog transmit signal;
a receiver chain comprising a first analog-to-digital converter (ADC);
a second DAC;
a digital signal processor comprising an adaptive signal cancellation digital signal processing (DSP) algorithm, the digital signal processor coupled to an output of the first ADC and coupled to an input of the second DAC; and
a summer coupled to an output the second DAC and coupled to an input of the first ADC,
wherein the digital signal processor produces a digital cancellation signal, the second DAC converts the digital cancellation signal into an analog digital cancellation signal, the summer receives an analog receive signal comprising a self-interference signal, and the analog digital cancellation signal represents an out-of-phase version of the self-interference signal.

2. The device of claim 1 further comprising a second ADC coupled to an input of the digital signal processor, wherein the second ADC converts the analog receive signal to a digital receive signal.

3. The device of claim 1, wherein the digital signal processor receives as input a digital transmit signal, the first DAC receives as input the digital transmit signal.

4. The device of claim 1, wherein the digital signal processor comprises a blind source separation algorithm.

5. The device of claim 1, wherein the digital signal processor comprises a multi-dimensional compensator.

6. The device of claim 5, wherein the digital signal processor comprises an adaptive system identification algorithm to optimize coefficients within the multi-dimensional compensator.

7. The device of claim 1 further comprising:
a third ADC, an adaptive signal cancellation digital signal processor, and a third DAC, an output of the third DAC is coupled to an input of the summer; and
a delay receiving the analog receive signal, wherein an output of the delay is coupled to an input of the summer.

8. A device comprising:
a transmit chain comprising a first digital-to-analog converter (DAC) and a power amplifier, wherein the transmit chain produces an analog transmit signal;
a receiver chain comprising a first analog-to-digital converter (ADC);
a second DAC;
a digital signal processor comprising an adaptive signal cancellation digital signal processing (DSP) algorithm, the digital signal processor coupled to an output of the first ADC and coupled to an input of the second DAC; and
a summer coupled to an output the second DAC and coupled to an input of the first ADC,
wherein the digital signal processor comprises a linear finite impulse response filter and an adaptive linear system identification algorithm to optimize linear filter coefficients within the linear finite impulse response filter.

9. A device comprising:
a transmit chain comprising a first digital-to-analog converter (DAC) and a power amplifier, wherein the transmit chain produces an analog transmit signal;
a receiver chain comprising a first analog-to-digital converter (ADC);
a second DAC;
a digital signal processor comprising an adaptive signal cancellation digital signal processing (DSP) algorithm, the digital signal processor coupled to an output of the first ADC and coupled to an input of the second DAC; and
a summer coupled to an output the second DAC and coupled to an input of the first ADC,
wherein the digital signal processor comprises a nonlinear Volterra filter.

10. The device of claim 9, wherein the digital signal processor comprises an adaptive nonlinear system identification algorithm to optimize nonlinear filter coefficients within the Volterra filter.

11. A method for cancelling self-interference in a transceiver, the method comprising the steps:
receiving an analog receive signal;
combining the analog receive signal with an analog cancellation signal to produce a combined analog signal; wherein the analog cancellation signal represents an out-of-phase version of a self-interference signal introduced by a transmit chain of a transceiver;
converting the combined analog receive signal to a combined digital signal,
inputting the combined digital signal and a digital transmit signal into a digital signal processor implementing an adaptive signal cancellation digital signal processing (DSP) algorithm;
producing, at the digital signal processor, a digital cancellation signal;
converting the digital cancellation signal into the analog cancellation signal; and
adjusting a linear model and a nonlinear model in the adaptive signal cancellation DSP algorithm.

12. The method of claim 11 further comprising the steps of:
- converting the analog receive signal to a digital receive signal; and
- inputting the digital receive signal into the digital signal processor.

13. The method of claim 11, wherein the digital signal processor comprises a blind source separation algorithm.

14. The method of claim 11, wherein the step of adjusting a linear model and a nonlinear model in the adaptive signal cancellation DSP algorithm comprises the step of optimizing linear filter coefficients and nonlinear filter coefficients.

15. The method of claim 11 further comprising the steps of:
- producing a delayed analog receive signal from the analog receive signal;
- converting the analog receive signal into a digital receive signal;
- adjusting an amplitude and a phase of the digital receive signal to produce an adjusted signal; and
- combining the delayed analog receive signal and the adjusted signal with the combined analog signal to cancel external interference in the analog receive signal.

16. A method for calibrating a linear model and a nonlinear model in a self-interference signal canceller, the method comprising the steps:
- receiving an analog predetermined test signal;
- converting the analog predetermined test signal to a digital test signal,
- inputting the digital test signal and a digital transmit signal into a digital signal processor implementing an adaptive signal cancellation digital signal processing (DSP) algorithm;
- producing, at the digital signal processor, a digital cancellation signal; and
- identifying a linear model and a nonlinear model in the adaptive signal cancellation DSP algorithm.

17. The method of claim 16, further comprising the steps of:
- converting the digital cancellation signal to an analog cancellation signal;
- combining the analog predetermined test signal with the analog cancellation signal to produce a combined analog signal, wherein the analog cancellation signal represents an out-of-phase version of a self-interference signal introduced by a transmit chain of a transceiver;
- converting the combined analog receive signal to a combined digital signal,
- inputting the combined digital signal and the digital transmit signal into the digital signal processor; and
- adjusting the linear model and the nonlinear model in the adaptive signal cancellation DSP algorithm.

* * * * *